US012688375B2

(12) United States Patent
Salim et al.

(10) Patent No.: US 12,688,375 B2
(45) Date of Patent: Jul. 21, 2026

(54) METHODS, SYSTEMS, DEVICES AND NEURAL NETWORKS FOR FORECASTING A TIME SERIES

(71) Applicant: NewSouth Innovations Pty Limited, New South Wales (AU)

(72) Inventors: Flora D. Salim, New South Wales (AU); Hao Xue, New South Wales (AU)

(73) Assignee: NEWSOUTH INNOVATIONS PTY LIMITED, Sydney (AU)

(*) Notice: Subject to any disclaimer, the term of this patent is extended or adjusted under 35 U.S.C. 154(b) by 221 days.

(21) Appl. No.: 18/717,983

(22) PCT Filed: Dec. 9, 2022

(86) PCT No.: PCT/IB2022/020078
§ 371 (c)(1),
(2) Date: Jun. 7, 2024

(87) PCT Pub. No.: WO2023/105294
PCT Pub. Date: Jun. 15, 2023

(65) Prior Publication Data
US 2024/0412008 A1      Dec. 12, 2024

(30) Foreign Application Priority Data
Dec. 10, 2021      (AU) ................................ 2021904006

(51) Int. Cl.
G06F 40/40      (2020.01)
G06F 40/186      (2020.01)
G06N 3/08      (2023.01)

(52) U.S. Cl.
CPC ............ *G06F 40/40* (2020.01); *G06F 40/186* (2020.01); *G06N 3/08* (2013.01)

(58) Field of Classification Search
CPC .......... G06F 40/40; G06F 40/186; G06N 3/08
See application file for complete search history.

(56) References Cited

U.S. PATENT DOCUMENTS

| | | | | |
|---|---|---|---|---|
| 11,825,023 | B2* | 11/2023 | Spohrer | G06N 3/006 |
| 12,181,847 | B1* | 12/2024 | Brett | G06N 20/00 |
| 12,468,719 | B2* | 11/2025 | Cheng | G06F 16/2477 |

(Continued)

FOREIGN PATENT DOCUMENTS

EP          3086237 A1      10/2016

OTHER PUBLICATIONS

He et al., "Robust Dual Recurrent Neural Networks for Financial Time Series Prediction", Proceedings of the 2021 SIAM International Conference on Data Mining (SDM), 2021, pp. 747-755.

(Continued)

*Primary Examiner* — Mohammad K Islam
(74) *Attorney, Agent, or Firm* — Knobbe, Martens, Olson & Bear, LLP

(57) ABSTRACT

Methods, systems, devices, and neural networks are for forecasting a time series. According to one example, a natural language processing engine receives input natural language describing historical data of a time series and, based on the input natural language, generates output natural language which describes a forecast for the time series.

18 Claims, 24 Drawing Sheets

(56) References Cited

U.S. PATENT DOCUMENTS

| | | | | |
|---|---|---|---|---|
| 2015/0324698 A1* | 11/2015 | Karaoguz | | H04L 67/12 |
| | | | | 706/46 |
| 2020/0342968 A1* | 10/2020 | Avinash | | A61B 5/7267 |
| 2021/0099317 A1* | 4/2021 | Hilleli | | G06F 40/216 |
| 2021/0312086 A1* | 10/2021 | Kim | | G06F 18/214 |

OTHER PUBLICATIONS

Ho et al., "Stock Price Movement Prediction Using Sentiment Analysis and CandleStick Chart Representation", Sensors, 2021, pp. 1-18.

International Search Report and Written Opinion issued in International Application No. PCT/IB2022/020078, mailed on Feb. 17, 2023.

Long et al., "News Event Prediction using Causality Approach on South China Sea Conflict", IEEE 3rd International Cyber Resilience Conference (CRC), 2021, in 6 pages.

Novák, V., "Linguistic Characterization of Time Series", Fuzzy Sets and Systems, 2016, vol. 285, in 31 pages.

Vaswani et al., "Attention Is All You Need", 31st Conference on Nueral Information Processing Systems (NIPS), arXiv, 2017, in 15 pages.

Yildiz et al., "Classification and Comparison via Neural Networks", Neural Networks, 2019, vol. 118, pp. 1-42.

Zhou et al., "Informer: Beyond Efficient Transformer for Long Sequence Time-Series Forecasting", arXiv, 2021, in 15 pages.

* cited by examiner

Fig. 2

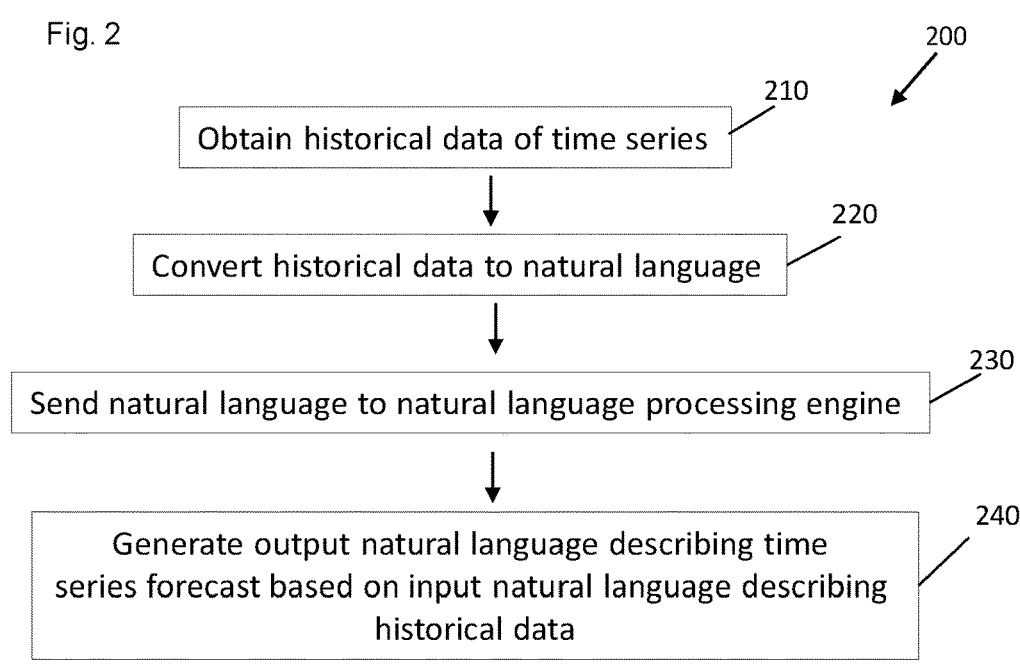

210 — Obtain historical data of time series

220 — Convert historical data to natural language

230 — Send natural language to natural language processing engine

240 — Generate output natural language describing time series forecast based on input natural language describing historical data

Fig. 3A

Computing system 300A

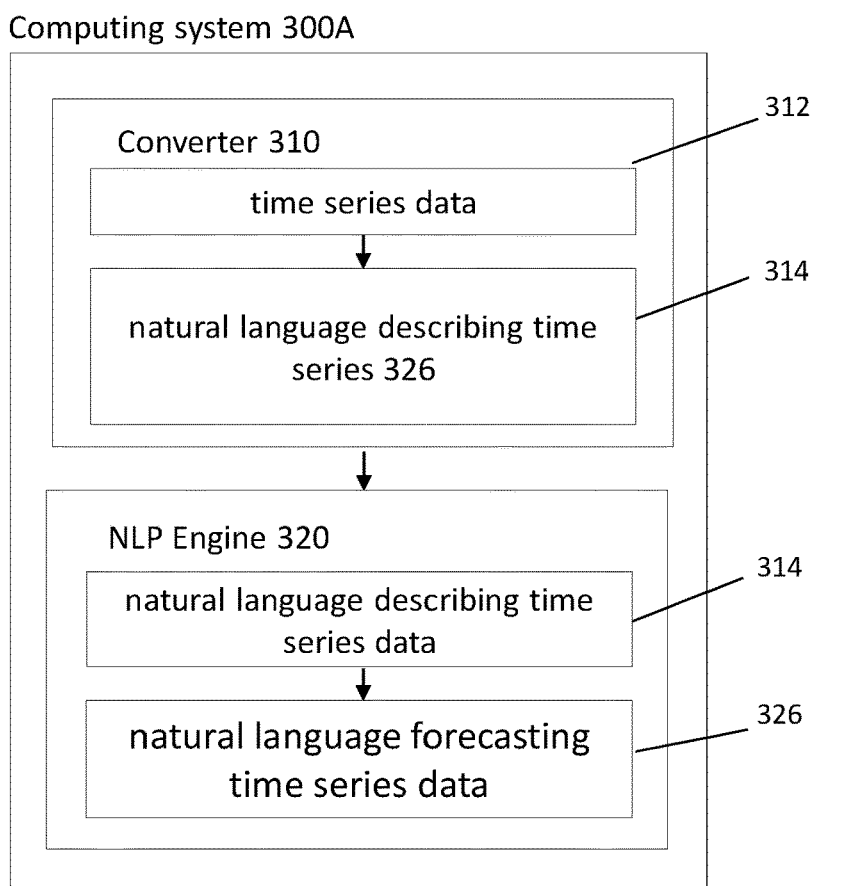

Converter 310 time series data    312 natural language describing time series 326    314

NLP Engine 320 natural language describing time series data    314 natural language forecasting time series data    326

Fig. 5

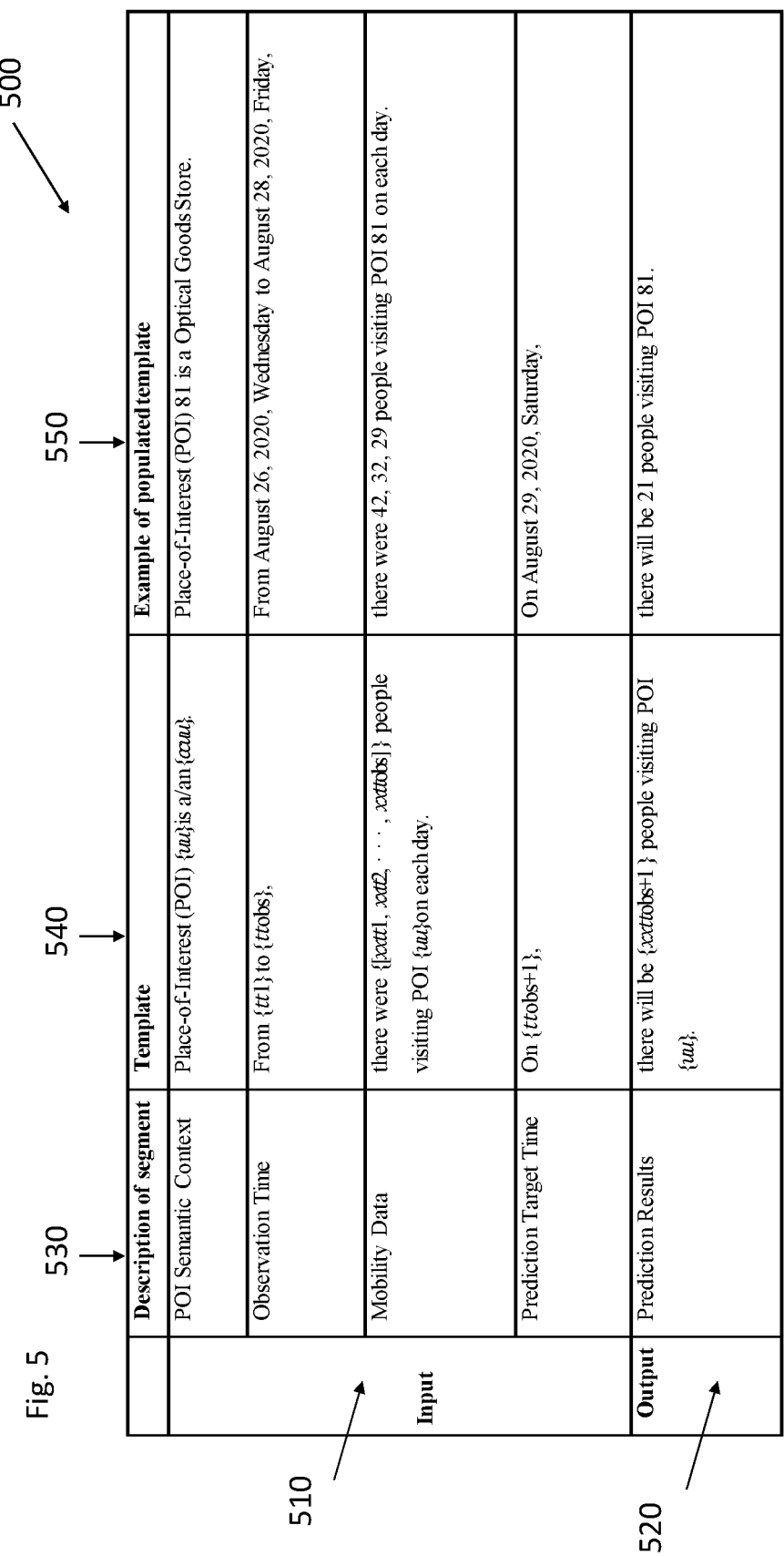

| | Description of segment | Template | Example of populated template |
|---|---|---|---|
| | POI Semantic Context | Place-of-Interest (POI) {*ua*}is a/an {*ccua*}; | Place-of-Interest (POI) 81 is a Optical GoodsStore. |
| Input | Observation Time | From {*tt*1} to {*ttobs*}, | From August 26, 2020, Wednesday to August 28, 2020, Friday, |
| | Mobility Data | there were {[*xxtt*1, *xxtt*2, ···, *xxttobs*]} people visiting POI {*ua*}on each day. | there were 42, 32, 29 people visiting POI 81 on each day. |
| | Prediction Target Time | On {*ttobs*+1}, | On August 29, 2020, Saturday, |
| Output | Prediction Results | there will be {*xxttobs*+1} people visiting POI {*ua*}. | there will be 21 people visiting POI 81. |

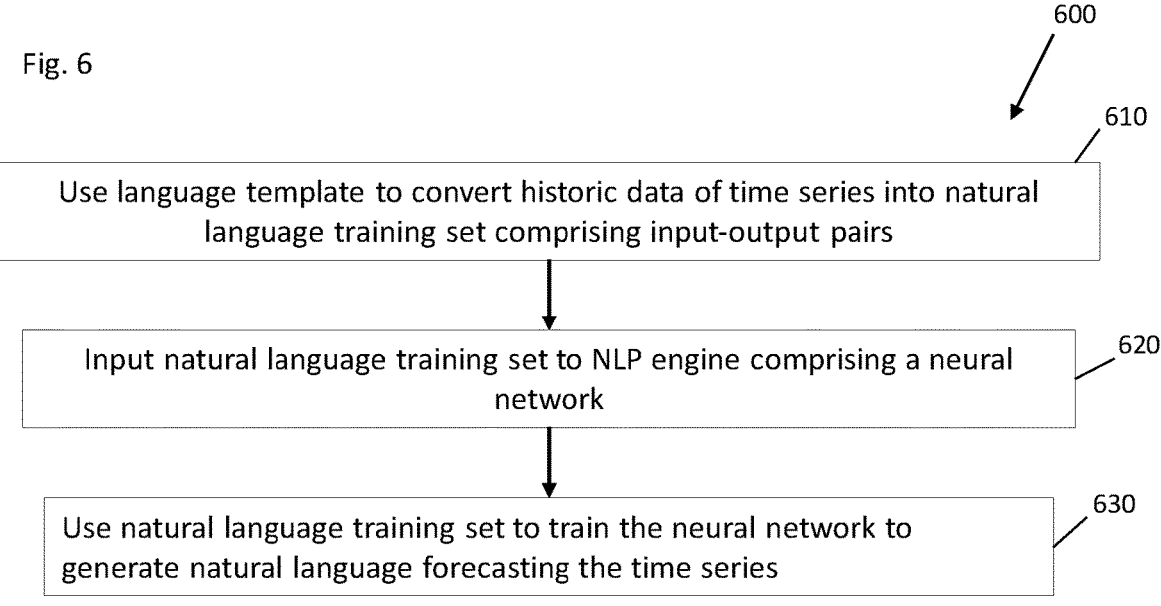

Use language template to convert historic data of time series into natural language training set comprising input-output pairs

620

Input natural language training set to NLP engine comprising a neural network

630

Use natural language training set to train the neural network to generate natural language forecasting the time series

Fig. 7

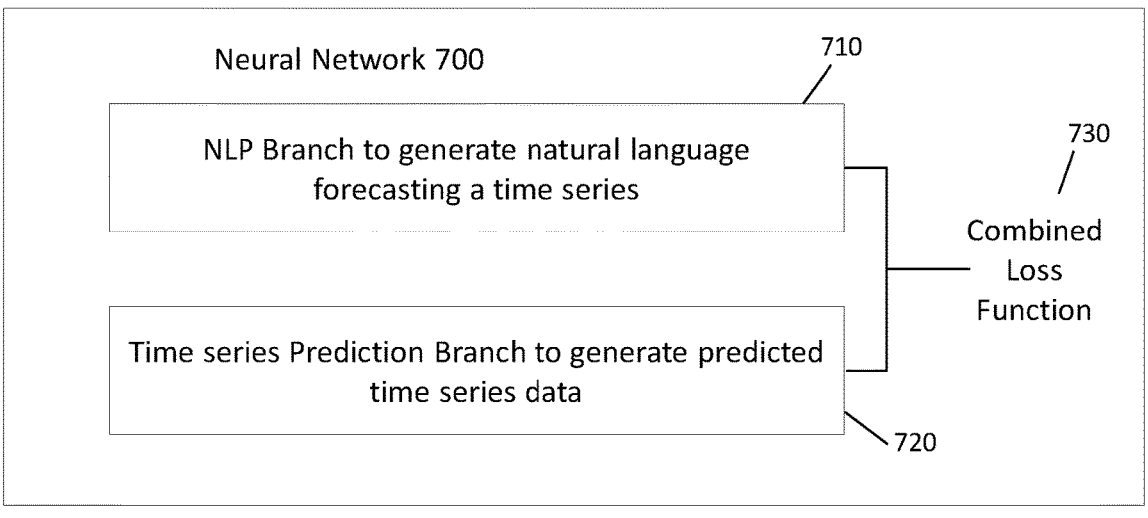

Neural Network 700

710

NLP Branch to generate natural language forecasting a time series

730

Combined Loss Function

Time series Prediction Branch to generate predicted time series data

| | NYC | Dallas | Miami |
|---|---|---|---|
| Collection Start Date | | 2020-06-15 | |
| Collection End Date | | 2020-11-08 | |
| Average Visits per Day | 17.082 | 21.520 | 22.977 |
| Max Number of Visits | 246 | 2746 | 1550 |
| Total Number of POIs | 479 | 1374 | 1007 |
| Number of Categories | 39 | 65 | 51 |

Distribution of no. of visits in three datasets (a) NYC

Distribution of no. of visits in three datasets (b) Dallas (c) Miami

| | NYC | | Dallas | | Miami | | Average | |
|---|---|---|---|---|---|---|---|---|
| | RMSE | MAE | RMSE | MAE | RMSE | MAE | RMSE | MAE |
| LR | 9.131 | 5.639 | 24.544 | 6.601 | 13.081 | 6.082 | 15.585 | 6.107 |
| Gru | 7.547 (0.098) | 4.550 (0.038) | 23.987 (0.262) | 5.400 (0.016) | 12.125 (0.160) | 5.413 (0.026) | 14.553 | 5.121 |
| GruA | 7.704 (0.107) | 4.464 (0.037) | 22.562 (0.433) | 5.276 (0.048) | 11.465 (0.417) | 5.045 (0.107) | 13.910 | 4.928 |
| Transformer | 6.714 (0.072) | 4.279 (0.058) | 18.820 (0.278) | 5.166 (0.125) | 10.995 (0.181) | 5.130 (0.117) | 12.176 | 4.858 |
| Reformer | 6.626 (0.061) | 4.395 (0.074) | 17.392 (0.178) | 5.120 (0.037) | 10.578 (0.242) | 5.117 (0.065) | 11.532 | 4.877 |
| Informer | 6.509 (0.073) | 4.248 (0.065) | 19.386 (0.383) | 6.717 (0.453) | 9.858 (0.171) | 5.159 (0.103) | 11.918 | 5.375 |
| S2S(GruA) | 6.901 (0.212) | 4.290 (0.042) | 19.914 (1.259) | 5.165 (0.067) | 9.964 (0.632) | 5.009 (0.055) | 12.260 | 4.821 |
| S2S(Transformer) | 6.657 (0.070) | 4.286 (0.075) | 18.212 (1.422) | 5.036 (0.096) | 9.672 (0.605) | 5.034 (0.105) | 11.514 | 4.785 |
| S2S(BART) | 6.645 (0.166) | 4.313 (0.232) | 18.978 (2.102) | 4.968 (0.045) | 9.724 (0.307) | 4.834 (0.016) | 11.782 | 4.705 |
| SHIFT | 6.426 (0.067) | 4.274 (0.049) | 15.248 (0.367) | 4.928 (0.043) | 8.580 (0.159) | 4.951 (0.028) | 10.085 | 4.718 |

Performance results of different methods on the three datasets. In each row, the best performer is shown in bold and the second best is underlined

Fig. 11

|  | GPU memory (MB) | # Parameters |
| --- | --- | --- |
| Gru | 879 | $0.396 \times 10^6$ |
| GruA | 911 | $0.922 \times 10^6$ |
| Transformer | 1009 | $3.194 \times 10^6$ |
| Reformer | 1077 | $4.342 \times 10^6$ |
| Informer | 1007 | $4.410 \times 10^6$ |
| S2S(GruA) | 1450 | $3.919 \times 10^6$ |
| S2S(Transformer) | 1455 | $4.898 \times 10^6$ |
| S2S(BART) | 6743 | $139.42 \times 10^6$ |
| SHIFT (Ours) | 1469 | $4.898 \times 10^6$ |

Comparison of computational cost

Fig. 12

| | NYC | | Dallas | | Miami | | Average | |
|---|---|---|---|---|---|---|---|---|
| | RMSE | MAE | RMSE | MAE | RMSE | MAE | RMSE | MAE |
| SHIFT (w/o NL branch) | 6.714 (0.072) | 4.279 (0.058) | 18.820 (0.278) | 5.166 (0.125) | 10.995 (0.181) | 5.130 (0.117) | 12.176 | 4.858 |
| SHIFT (w/o Mob branch) | 6.657 (0.070) | 4.286 (0.075) | 18.212 (1.422) | 5.036 (0.096) | 9.672 (0.605) | 5.034 (0.105) | 11.514 | 4.785 |
| SHIFT (basic) | 6.493 (0.056) | 4.365 (0.057) | 18.292 (1.715) | 5.037 (0.124) | 8.792 (0.254) | 5.133 (0.093) | 11.192 | 4.845 |
| SHIFT (siamese) | 6.519 (0.077) | 4.317 (0.014) | 19.311 (1.242) | 5.212 (0.091) | 8.760 (0.155) | 5.020 (0.068) | 11.530 | 4.850 |
| SHIFT | 6.426 (0.067) | 4.274 (0.049) | 15.248 (0.367) | 4.928 (0.043) | 8.580 (0.159) | 4.951 (0.028) | 10.085 | 4.718 |

Prediction results of the ablations studies on all three datasets, without (w/o) the specifically mentioned branches of using different modes.

Fig. 13

| | NYC | | Dallas | | Miami | | Average | |
|---|---|---|---|---|---|---|---|---|
| | RMSE | MAE | RMSE | MAE | RMSE | MAE | RMSE | MAE |
| Prompt A | 6.426 (0.067) | 4.274 (0.049) | 15.248 (0.367) | 4.928 (0.043) | 8.580 (0.159) | 4.951 (0.028) | 10.085 | 4.718 |
| Prompt B (w/o semantic) | 6.496 (0.091) | 4.301 (0.047) | 16.035 (0.633) | 5.032 (0.012) | 8.688 (0.223) | 4.982 (0.041) | 10.406 | 4.772 |

The prediction performance of using different Prompts in SHIFT

Fig. 14

(a) Loss Factor:RMSE

The impact of loss factor $\alpha_{loss}$ and momentun factor $\alpha_m$ (b) Loss Factor: MAE The impact of loss factor $\alpha_{loss}$ and momentun factor $\alpha_m$ (c) Momentum Factor: RMSE The impact of loss factor $\alpha_{loss}$ and momentun factor $\alpha_m$ (d) Momentum Factor: MAE The impact of loss factor $\alpha_{loss}$ and momentun factor $\alpha_m$ (a) RMSE The performance of different observation lengths (b) MAE The performance of different observation lengths The visualization of two cases (one in the upper half and one in lower half). For each case, the first row shows the attention of S2S (transformer) and the attention of SHIFT is presented in the second row.

The visualization of two cases (one in the upper half and one in lower half). For each case, the first row shows the attention of S2S (transformer) and the attention of SHIFT is presented in the second row.

METHODS, SYSTEMS, DEVICES AND NEURAL NETWORKS FOR FORECASTING A TIME SERIES

TECHNICAL FIELD

The present disclosure relates to methods, neural networks and computer systems or devices for forecasting a time series. Methods of training a neural network to forecast a times series and computer readable storage medium storing instructions for performing the forecasting and training methods are also disclosed.

BACKGROUND

A time series is a sequence of data points listed in time order. For example, a time series may comprise a sequence of numerical data points taken at successive equally spaced points in time. In some examples, a time series may comprise a plurality of numerical data points and corresponding time values of the data points. Time series may be used to describe various phenomena including, but not limited to, human mobility. For example, the number of people visiting a shop over a period of time may be expressed as a time series with each data point corresponding to a number of people who visited in a certain period of time (e.g. the data points may correspond to the number of people visiting on successive days).

Forecasting a time series refers to predicting the value(s) of one or more future data points of the time series. Various methods have been developed for forecasting a time series based on historical data and some of these methods use neural networks.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method comprising: obtaining historical data of a time series; converting, by a converter module, the historical data of the time series into natural language describing the historical data; sending the natural language describing the historical data to a natural language processing engine; generating, by the natural language processing engine, output natural language which describes a forecast for the time series based on the natural language describing the historical data; wherein the converter module and the natural language processing engine are implemented by one or more processors.

The natural language engine may be implemented by a neural network including a natural language branch and an auxiliary branch comprising a numerical time series predictor, and the neural network may have been trained on historical data of the time series using a combined loss function for the natural language branch and the auxiliary branch.

The historical data may include time series data comprising a plurality of numerical data points and a plurality of time values corresponding to the numerical data points. The historical data may include an identifier which identifies a subject of the time series. The contextual data may include semantic data describing a property of a subject of the time series or a property of one or more time values of the time series. The historical data may include geographic data, such as but not limited to human mobility data or weather data.

In some embodiments, the time series includes a sequence of observations at different points in time of a number of people at one or more places of interest (POI) and optionally also includes text data categorising the POI (e.g. POI type) and/or text data describing conditions relevant to one or more of the observations (e.g. weather, day is a holiday etc.).

In some embodiments, the converter module converts the historical data into natural language having a pre-defined format. The converter module may use a language template to convert the historical data into natural language describing the historical data. The natural language template may comprise one or more predefined sentences or phrases including a plurality of gaps which are to be populated by historical data of the time series.

In some embodiments, the method comprises receiving, by a virtual assistant module, a natural language question; determining, by the virtual assistant module, a point of interest (POI) relevant to the natural language question; obtaining, by the virtual assistant module, historical data of a time series which historical data is relevant to the natural language question and the determined POI; and sending, by the virtual assistant module, the obtained historical data to the converter module.

Some embodiments relate to a method comprising: converting historical data of a time series into a natural language training set comprising natural language input-output pairs, each natural language input-output pair comprising an input description describing the time series in a first time period and a corresponding output description describing a forecast for the time series in a second time period; inputting the natural language training set comprising the natural language input-output pairs into a neural network which is configured to implement a natural language processing engine; and using the natural language training set to train the neural network to generate a natural language output making a time series forecast in response to receiving a natural language input describing historical data of the time series.

The historical data may include a plurality of time series, each time series having an identifier identifying a subject of the time series, wherein the subject may for example be a client, a location, a point of interest, a person or a sensor. The historical data may further comprise contextual data relating to a subject of the times series or relating to one or more time values or data points of the time series.

In some embodiments, the neural network comprises: a natural language processing branch; and a numerical time-series prediction branch; and wherein the method comprises: inputting the natural language training set into the natural language processing branch; inputting the historic data into the time-series prediction branch; and determining outputs of the natural language processing branch and the time-series prediction branch; and training the neural network by applying a combined loss function to the outputs of the natural language processing and time-series prediction branches.

The natural language processing branch and the auxiliary branch may be linked by a momentum function. The momentum function may have a momentum factor between 0.001 and 0.1. The combined loss function may have a loss of 0.1 or less. The time series may comprises a sequence of observations and the number of observations in the historic data set is in the range of 5 to 20 observations.

In some embodiments, converting the historical data into a natural language training set comprises: using a natural language template including a pre-defined input description having one or more gaps and a pre-defined target description having one or more gaps; and populating one or more gaps of the predefined input description with historical data of the time series from a first time period and populating one or more gaps of the predefined target description with historical data of the time series from a second time period.

Some embodiments relate to non-transitory computer readable storage medium storing machine readable instructions which are executable by a processor to perform any one of the described methods.

Some embodiments relate to a computing system for forecasting a time series comprising: one or more processors; memory comprising computer executable instructions, which when executed by the one or more processors, cause the computing device to perform any one of the described methods.

Some embodiments relate to computing system for forecasting a time series comprising: a converter configured to convert historical data of a time series into natural language describing the historical data; and a natural language processing engine configured to receive the natural language from the converter and generate an output natural language describing a time series forecast based on the natural language received from the converter.

The system may be configured to extract numerical data from the output natural language and produce an output based on the numerical data (e.g. output numbers, graphics or audio). The natural language processing engine may be implemented by a neural network comprising a natural language processing branch and a time-series prediction branch which is connected to the natural language processing branch by a combined loss function, the time-series prediction branch is configured to output a time-series forecast in numerical form, and the system may be configured to output numerical data, graphics or audio based on time-series forecast output by the time-series prediction branch. The system may be configured to automatically control a physical process or initiate an electronic transaction based on the numerical data.

Some embodiments relate to a neural network comprising: a natural language processing branch configured to generate output natural language forecasting a time series in response to input natural language describing historic data of the time series; a time-series prediction branch configured to generate predicted time series data in response to an input comprising historic data of the time series data; wherein the natural language processing branch and the time-series prediction branch are connected by a combined loss function which combines outputs of the natural language processing branch and the time-series prediction branch.

The natural language processing branch may include an encoder and a decoder. The natural language processing branch and the time-series prediction branch may be linked by a momentum function.

Some embodiments relate to a neural network which has been trained according to any one of the described methods.

Some embodiments relate to a method comprising: receiving natural language describing historical data of a time series; inputting the natural language describing the historical data to a natural language processing engine which has been trained on plurality of sentence pairs, each sentence pair comprising an input sentence describing the time series in a first time period and a corresponding target sentence forecasting the time series in a second time period; generating, by the natural language processing engine, output natural language which describes a forecast for the time series based on the natural language describing the historical data; wherein the natural language processing engine is implemented by one or more processors.

Some embodiments relate to a computing device comprising one or more processors and a non-transitory machine readable medium storing instructions executable by the one or more processors to perform any one of the described methods.

Some embodiments related to a method comprising: obtaining historical data of a time series; converting, by a converter module, the historical data of the time series into natural language describing the historical data; sending the natural language describing the historical data to a natural language processing engine; and receiving from the natural language processing engine, output natural language which describes a forecast for the time series based on the natural language describing the historical data; wherein the converter module is implemented by one or more processors.

Some embodiments relate to a computing device comprising one or more processors and a non-transitory machine readable medium storing instructions executable by the one or more processors to perform any one of the described methods.

Further aspects and features of the present disclosure are provided in the following description and the appended claims.

BRIEF DESCRIPTION OF DRAWINGS

Examples of the present disclosure will now be described, by way of non-limiting example only, with reference to the accompanying drawings, in which:

FIG. 2 is a schematic diagram showing a method of forecasting a time series using a natural language processing engine according to one example;

FIG. 3A is a schematic diagram showing a computer system for forecasting a time series using a natural language processing engine according to one example;

FIG. 5 is a table illustrating an example language template and population of the language template with historical data according to one example;

FIG. 6 is a schematic diagram showing a method of training a natural language processing engine according to one example;

FIG. 7 is a schematic diagram showing a neural network having a natural language processing branch and an auxiliary branch according to one example;

FIG. 9 is a table showing mobility data according to one example;

FIG. 11 is a table showing the performance results of different methods of forecasting time series according to one example;

FIG. 12 is table comparing the computational cost of different methods of forecasting time series according to one example;

FIG. 13 is a table showing the prediction results from ablation studies of a method of forecasting a time series according to one example;

FIG. 14 is table comparing the prediction performance when using different prompts according to one example;

DESCRIPTION OF EMBODIMENTS

Figure 1A:
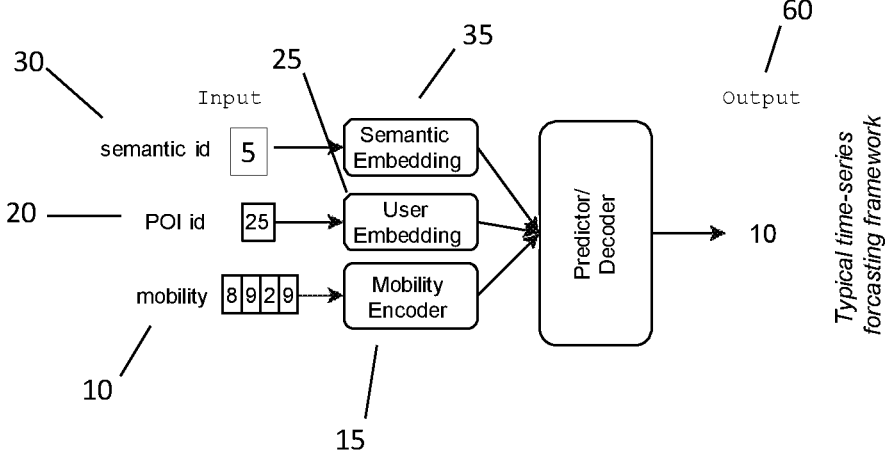
FIG. 1A is a schematic diagram showing a method of forecasting a time series using a numerical time series predictor according to one example.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The terms "includes" means includes but not limited to, the term "including" means including but not limited to. The term "based on" means based at least in part on. The term "number" means any natural number equal to or greater than one. The terms "a" and "an" are intended to denote at least one of a particular element.

Time series may be used to track and forecast various different phenomena including, but not limited to, patterns of human movement (also referred to as human mobility), road traffic, computer network traffic, weather, pollution, spread of an epidemic, sensor readings, demand for or consumption of electricity or gas, volume of sales, usage of an App or software application etc.

A time series may comprise a sequence of data points listed, or otherwise indexed, in time order. For instance, a time series may comprise a sequence of data points taken at successive equally spaced time intervals and listed in time order, or a plurality of data points and corresponding time values. The data points may be numerical data points, for instance a number of people visiting a shop on a particular day, or a temperature at a particular geographical location, a number of people contracting a disease at a particular geographic location, monthly or daily kilowatt hours of electricity demanded by a particular city, a reading from a sensor etc.

A time series may relate to a particular subject such as a client, a geographic location (such as a country, a city, a suburb or particular area), a point of interest (such as a shop, a road junction, a station or shopping mall etc.), a person, or a sensor (such as a sensor mounted to machinery, electrical equipment, a person or a particular location). Contextual data of a time series refers to data which provides context to the subject of the time series, or particular data points, or time values of the time series. For instance, for a time series relating to the number of people visiting a point of interest (POI) on successive days, contextual data may include the type of point interest (e.g. sports shop, restaurant, clothes shop), a geographic location of the point of interest, the weather on a particular day or whether a particular day is a public holiday. If the time series relates to a temperature sensor mounted on machinery, then contextual data may for example include the background room temperature.

One method of forecasting a time series is to use a numerical prediction model. For instance, numerical values corresponding to historical data points of the time series may be used as a training set to train a neural network to predict future values of the time series. However, such numerical prediction models are inflexible, which makes it difficult to incorporate contextual data into the model. Adapting a numerical prediction model to accept new types of contextual data may involve significant design and programming work, result in a complicated model structure and/or fail to provide forecasts with the desired level of accuracy.

A: Natural Language Processing to Forecast Time Series

Accordingly, one aspect of the present disclosure proposes using a natural language processing (NLP) model to forecast a time series. This approach is flexible as contextual data or other new types of input data can be easily integrated into the natural language processing model.

Figure 1B:
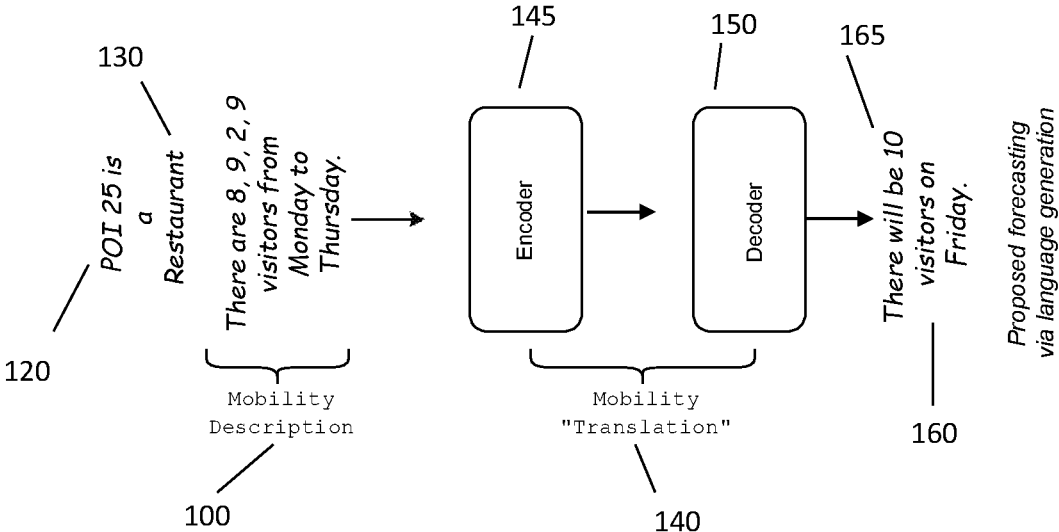
FIG. 1B is a schematic diagram showing a method of forecasting a time series using a natural language processing engine according to one example.

FIG. 1A is shows an example which uses a numerical prediction model to forecast a time series, while FIG. 1B which shows an example which uses a natural language processing model to forecast the time series.

In the examples of FIGS. 1A and 1B the time series is a human mobility time series which tracks the number of people visiting a point of interest (POI) over time. The historical data of the time series includes time series data comprising a plurality of numerical data points corresponding to different time periods and contextual data which provides context to the subject of the time series, the data points or time periods. In the example shown in FIGS. 1A and 1B, the time series data includes the data points 8, 9, 2, 9 indicating the number of people visiting the POI on Monday, Tuesday, Wednesday and Thursday respectively. The subject of the time series is a particular point of interest (POI) which is identified by a POI identifier. The contextual data includes a POI type, which in this case is in semantic form and indicates that the POI is a "restaurant".

Referring to FIG. 1A, the numerical time series predictor model takes a series of numerical values as inputs and generates a numerical value as an output. The inputs include mobility data 10 (numerical data points corresponding to the number of people on successive days), a POI identifier 20 and contextual data 30. As the contextual data was originally in semantic form it is replaced with a semantic id "5" in numerical form. The input mobility data is passed through an encoder 15 or an embedding layer 25, 35 to extract feature vectors. The features vectors are then concatenated and input to a predictor 50 to generate a prediction in the form of a numerical value (10 in the example) which is output 60.

There are two major limitations with the numerical time series prediction model of FIG. 1A. Firstly, if there are multiple contexts (i.e. multiple pieces of contextual data providing different types of contextual information), the concatenation operation may not be the optimal way of merging these different data sources. It may be difficult or a neural network to learn or capture the latent correlations of multiple contexts when multiple features are appended together. Secondly, considering the inherent characteristics of different contexts, several different feature encoders or embedding layers are necessary for a numerical prediction model to learn the influence of these contexts. FIG. 1A already has three different feature encoders or embedding layers. If further contexts are added, each additional type of contextual data may require an additional feature encoder or embedding layer and these additions may dramatically increase the complexity of the prediction model and make the model harder to train.

FIG. 1B is a schematic diagram showing an example method of forecasting the same time series, but using a natural language processing engine 140. The input to the natural language processing engine is a mobility description 100 (more generally referred to as an "input description", which comprises natural language describing historical data of the time series. For instance, the natural language may include one or more sentences or phrases describing the historical data of the time series. The natural language describing the historical data may include an identifier (e.g. the POI identifier) 120, contextual data 130 and data points 110 of the time series, together with words which describe the data. The natural language describing the time series is input into the natural language processing engine 140. The natural language processing engine 140 comprises an encoder 145 which encodes the mobility description 100 and a decoder 150 which is trained to process the encoded mobility description to generate output natural language 160 describing a forecast for the time series. The output natural language may include a numerical value 165 corresponding to the forecast future value of the time series.

The method of FIG. 1B as a simpler structure than the method of FIG. 1A, as in the method of FIG. 1B, all of the various inputs can be combined into one or more natural language sentences and encoded by a single encoder 145. In contrast, in the method of FIG. 1A different encoders or embedding layers are needed for different types of input.

In the natural language forecasting method of FIG. 1B it is relatively easy to add additional types of contextual data, as additional pieces of data can simply be added to the natural language sentence(s) which are input to the encoder. For instance the mobility description could be modified to refer to the weather on some or all of the days, describe the geographical location of the POI or indicate if any of the days was a holiday. In contrast, in the numerical prediction model of FIG. 1A, it is difficult to add additional types of contextual data, as new types of contextual data will need new types of encoder or embedding layer. Further, a natural language processing engine is very adaptable and usually does not require fixed length or format for inputs and outputs and so can easily accommodate new types of data. In contrast, numerical predictor models tend to require fixed size and format of inputs and may utilize hidden network layers which require certain dimension for the input. In addition, whereas numerical predictor models as shown in FIG. 1A combine the different inputs by concatenation, this may not result in the best predictive performance. In contrast, the method of FIG. 1B is able to use natural language to combine the inputs and in some cases this may result in better predictive performance. Furthermore, whereas the numerical predictor model of FIG. 1A requires that all inputs to be in numerical form, in the natural language approach of FIG. 1B, some of the inputs (such contextual data 130) may be in semantic or textual form.

FIGS. 1A and 1B illustrate principles of the present disclosure using the example of human mobility forecasting. In particular they relate to customer flow prediction. However, the present disclosure is not limited to this and may be applied to other forms of human mobility forecasting, such as the next location prediction, contact tracing during a pandemic, crowd management etc. Furthermore, the above principles and techniques may be applied to forecasting other types of time series, such as but not limited to, road traffic, computer network traffic, weather, pollution, spread of an epidemic, sensor readings, demand for or consumption of electricity or gas, volume of sales etc.

B: System and Method for Forecasting a Time Series

FIG. 2 shows an example method 200 of forecasting a time series. The method comprises the following blocks.

At block 210 historical data of a time series is obtained. For instance, the historical data may be input by a user, received from a device or read from a database.

At block 220, the historical data of the time series is converted into natural language describing the historical data. The conversion may be performed bay conversion module.

At block 230, the natural language describing the historical data is sent to a natural language processing engine.

At block 240, the natural language processing engine generates output natural language which describes a forecast for the time series, based on the natural language describing the historical data.

The converter module and the natural language processing engine may be implemented by one or more processors. The one or more processors may for example be central processing units (CPUs), Field Programmable Gate Arrays (FPGAs), Application Specific Integrated Circuits (ASICs), other types of processing unit or a combination thereof and may be provided on a single device or distributed between multiple devices. The converter module and the natural language processing engine may be implemented on the same device or on different devices.

Figure 3B:
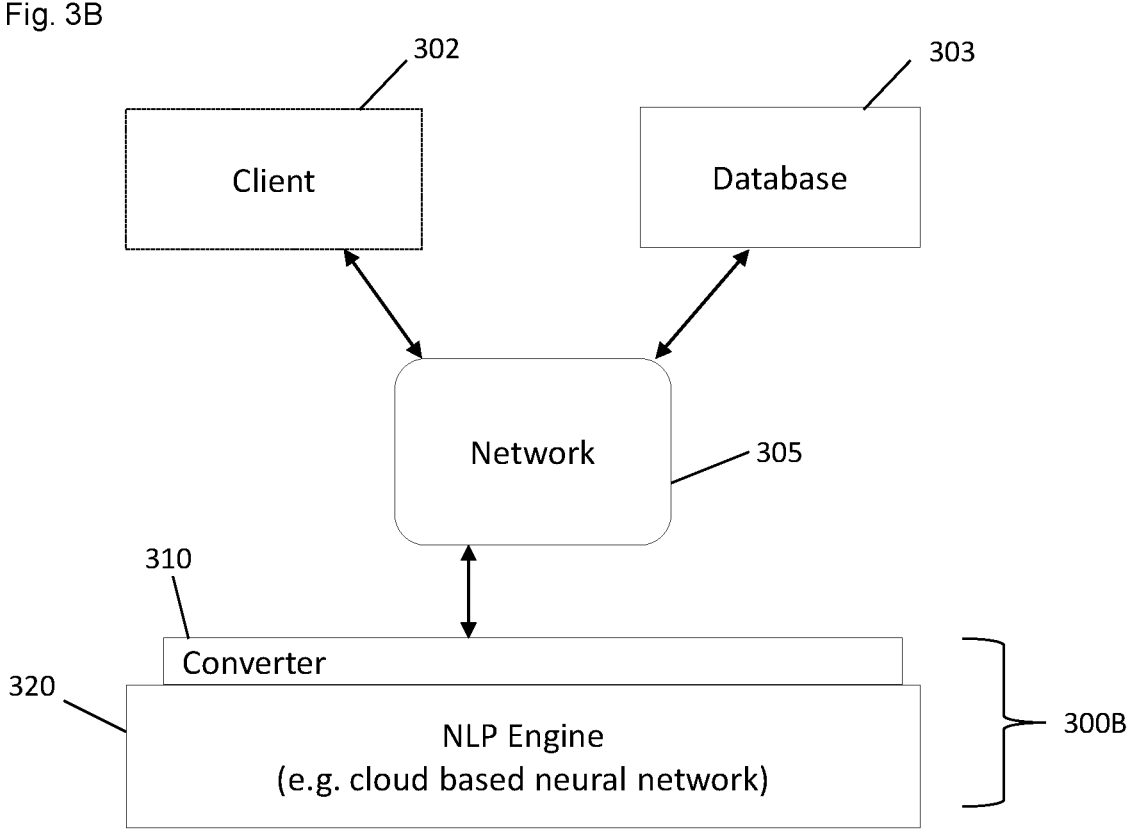
FIG. 3B is a schematic diagram showing a computer system for forecasting a time series using a natural language processing engine according to another example.
Figure 3C:
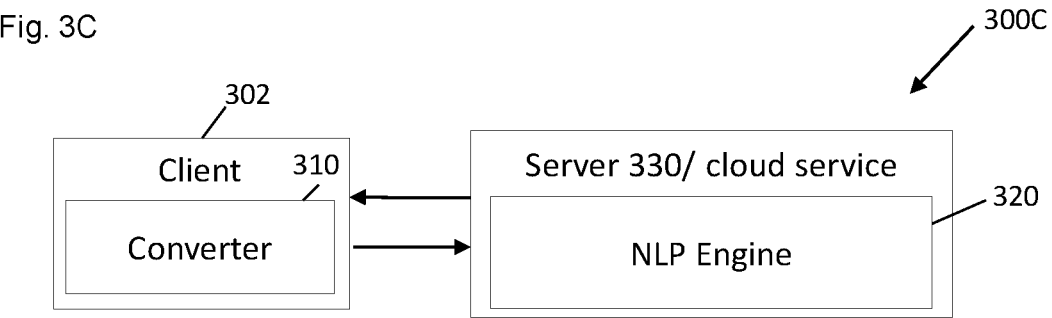
FIG. 3C is a schematic diagram showing a computer system for forecasting a time series using a natural language processing engine according to another example.

FIGS. 3A, 3B and 3C shows examples of computing systems 300A, 300B, 300C for forecasting a time series. The computing systems 300A, 300B and 300C are examples of various types of computing system which may be used to implement the method of FIG. 2.

In FIG. 3A, the computing system 300A includes a converter 310 (also referred to as a "converter module") and a natural language processing engine 320. The converter 310 is configured to convert historical data 312 of the time series into natural language 314 describing the historical data. The natural language processing engine 320 is configured to receive the natural language 314 from the converter and generate an output natural language 326 describing a time series forecast based on the natural language 314 received from the converter. The computing system 300 may be implemented on a desktop or notebook computer, a mobile computing device such as a mobile phone or tablet, a server, a virtual machine or a cloud service etc. The computing system 300 may include one or more processors and non-transitory computer readable storage media storing instructions which implement the converter 310 and the natural language processing engine 320 and/or implement the method of FIG. 2 when executed by the one or more processors.

FIG. 3B shows another example of a computing system 300B for forecasting a time series. The computing system 300B includes a converter 310 and a natural language processing engine 320, which may be the same as converter and natural language processing engine described above in FIG. 3A. The of the computer system 300B may be implemented by one or more processors of a desktop or notebook computer, server, virtual machine or cloud service etc. The computing system 300B may be configured to interact with a client device 302, such as but not limited to a mobile computing device, and/or a database 303. The converter 310 may obtain historical data of the time series from the client device 302 (e.g. from user input or a combination of user input and data generated by the client device), from the database 303 or from both the client device 302 and the database 303. The historical data may be sent to the converter 310 over a network 305. The network may be a wired or wireless network, such as but not limited to an Ethernet network, a local area network (LAN), an enterprise network a metropolitan area network, a wireless local area network (WLAN) or a telecommunications network etc. In one example, the client device 302 may instruct the computing system 300B to obtain some or all of the historical data from the database 303.

FIG. 3C shows a further example of a computing system 300C for forecasting a time series. The computing system 300C is similar to the computing systems of FIG. 3A and FIG. 3B, except that the converter 310 is implemented on the client device 302 and the natural language processing engine 320 is implemented on a server 330; the server 330 may be a physical server, a virtual machine or cloud computing service. The client device 302 may communicate with the server 330 over a dedicated link or a network such as the networks described above in FIG. 3B. In the example of FIG. 3C, the client device uses the converter or converter module 310 to convert the historical data of the time series into natural language describing the historical data and the natural language is sent to the server 330 where it is input to the natural language processing engine 330.

The historical data 312 of the time series includes time series data and may also include a time series identifier and/or contextual data. The time series data comprises a plurality of numerical data points taken at different points or periods of time. In some examples the time series data may also include a plurality of time values corresponding to the numerical data points, while in other examples the time values may be inferred, for instance if data points are presented in time order and equally spaced in time. The time series identifier identifies a subject of the time series and may for instance be an ID number. The contextual data is data which provides context to the subject of the time series or context to one or more of the data points or one or more of the time values. In some examples, the contextual data may include semantic data describing a property of a subject of the time series or a property of one or more time values or data values of the time series. In the context of this disclosure, semantic data refers to textual data which imparts meaning. In other cases the contextual data may include numerical data, such as a background temperature or measurable variable relating to the subject of the time series or one of the data points.

In some examples the historical data may include geographic data, for instance contextual data relating to a geographical location or time series data related to a geographical location, such as but not limited to human mobility data or weather data. Human mobility data may for instance include data points relating to a number of people at a POI (e.g. to forecast pedestrian flow or number of customers) or data points relating to POIs visited by a particular person (e.g. to forecast a next POI for a particular person, or the next time a particular person will stop at a particular POI). In some examples the time series may include a sequence of observations at different points in time of a number of people at one or more places of interest (POI) and optionally may also include text data categorising the POI (e.g. POI type) and/or text data describing conditions relevant to one or more of the observations (e.g. weather, day is a holiday etc.).

The natural language processing engine may comprise an encoder and a decoder. The encoder may tokenise the input natural language and convert the tokens into one or more vectors which are then encoded into a hidden state. For example, the encoder may be configured to convert the input natural language into a sequence of tokens (this is referred to as "tokenising" the input natural language). Each token may correspond to a building block of language such as a word or sub-word. In some cases, the tokenisation may use byte-pair encoding. After tokenising the input natural language, the encoder may embed the tokens into one or more vectors. The encoder may apply a function to the one or more vectors to yield a hidden state which is passed to the decoder. The decoder may apply a function to the hidden state to yield one or more vectors and may convert the one or more vectors into an output token sequence.

The decoder may then detokenize the output token sequence to produce output natural language. Whereas natural language engines are often trained to translate a source language into a target language or answer a question in response to a prompt, in the present disclosure the natural language engine is trained to convert an input natural language description of historical data of a time series into an output natural language description of a time series forecast. In addition to historical data of the time series, the input natural language may also include natural language referring to the time value (e.g. time period) for which a forecast is desired.

C: Neural Network with Natural Language Branch and Auxiliary Branch

The natural language processing engine 320 may be implemented by a neural network. In some examples, the neural network may be trained on natural language alone. In other examples, as shown in FIG. 7, the neural network 700 may include both a natural language branch 710 and an auxiliary branch 730 comprising a numerical time series predictor. In such cases, the neural network 700 may be trained on historical data of the time series using a combined loss function 730 for the natural language branch and the auxiliary branch.

In this way, as the natural language branch is trained together with the numerical time series predictor of the auxiliary branch, the auxiliary branch may help the neural network to place greater weight on the data points, time series identifier and/or contextual data contained in the input natural language description, rather than on other parts of the natural language description.

A numerical time series predictor is a predictor which use a numerical prediction model. A numerical time series predictor takes numerical values as inputs, outputs numerical values. A numerical time series predictor may be trained on a training set consisting of numerical values. The numerical time series predictor may for example use a multilayer perceptron (MLP) model, a long short-term memory (LSTM) model, gated recurrent units GRU model or a Transformer model. Each different type of data input to a numerical time series predictor is generally encoded by a different type of encoder.

In contrast, a natural language processing engine takes natural language as input, outputs natural language and is trained on natural language input-output pairs. While a natural language processing engine may use a Transformer structure, the internal workings are different to a numerical predictor, as the hidden layers of the natural language engine are trained on natural language. In contrast to a numerical time series predictor which may use a different type of encoder for each type of input data, a natural language engine receives all input as natural language and encodes the natural language using a tokenizer.

D: Converter Module and Language Template

The converter module may convert the historical data of the time series into natural language having a pre-defined format. The converter module may use a language template to convert the historical data into natural language describing the historical data. In some examples, the natural language template may comprise one or more predefined sentences or phrases including a plurality of gaps which are to be populated by historical data. The language template may include an input part defining a format of one or more sentences or phrases to be input to the natural language processing engine and an output part defining a format of one or more sentences or phrases to be output from the natural language processing engine.

Figure 4:
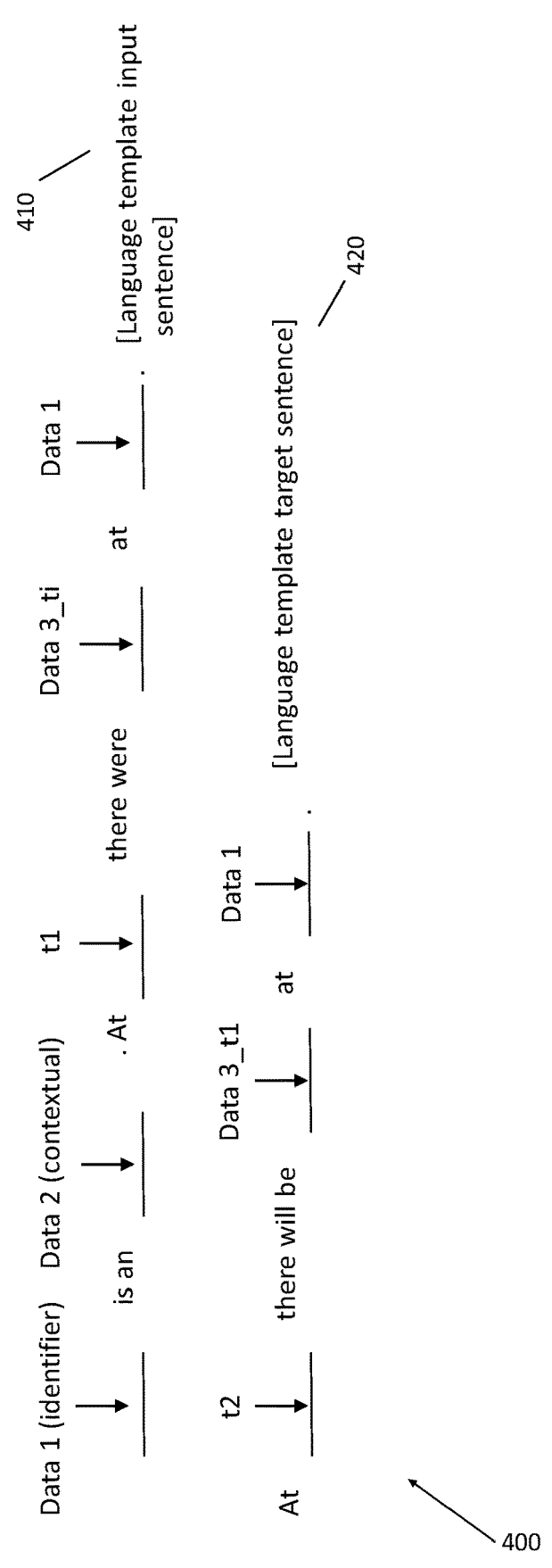
FIG. 4 is an example of a language template according to one example.

The top part of FIG. 4 shows an example of a language template 400 including a first part 410 for an input sentence, wherein the template comprises a predefined input sentence describing historical data of a time series using natural language and includes a plurality of gaps which are to be populated by historical data [data 1], [data 2], [t1], [data3_t1]. In this example data 1 is a time series identifier, data 2 is contextual data, t1 is a time value and data3_t1 is a historical data point of the time series at t1. Although not shown in FIG. 4, the first template may also include a gap to be populated by a time value of a requested forecast (e.g. "What will the value on t2 be?").

The bottom part of FIG. 4 shows an example of a second part 410 of a language template for an output sentence, wherein the template comprises a predefined output sentence describing a time series forecast in natural language and includes at least one gap to be populated by a forecast data point [data3_t2] and may include other gaps to be populated by other data [t2], [data 1] relating to the time series. In this example, data3_t2 is a historical data point of the time series at t2. It will be understand that FIG. 4 is an example only and the form of sentence(s) used by the language template, number of gaps and types of data can be varied depending on the particular application, type of time series and available data.

FIG. 5 is a table 500 illustrating an example language template 540 which could be used for a human mobility time series of the type shown in FIG. 1B. The rows of the table correspond to segments or phrases which together make up the language template, while column 530 describes the content of each phrase or segment, column 540 shows the language template itself and column 550 gives an example of the language template when populated with historical data or forecast data. The input part 510 of the template is shown in the first four rows, while the output part 520 of the template is shown in the bottom row. In column 540, the historical data and forecast data are shown in curly brackets { } in the template, so {u} refers to a POI id, {cu} refers to contextual data relating to the type of POI, {[xt1, xt2 . . . , xtobs]} refers to the number of visitors on t1, t2 . . . tobs, where t1 is a first day, t2 is a second day . . . tobs is the last observed day, {tobs+1} refers to the next day after the last observed day and {xtobs+1} refers to the number of visitors on tobs+1.

The converter module may be used in the training phase to convert historical data of the time series into natural language input-output description pairs for use in a natural language training set. In some cases, a converter module may also be used in the inference phase to convert historical data of a time series into a natural language input in order to prompt the natural language engine to generate a time series forecast.

An example method of training a neural network with historical time series data will now be described, before providing further examples of language templates and time series.

E: Training the Neural Network

FIG. 6 shows a method 600 of training a neural network to implement a natural language processing engine which can forecast a time series.

At block 610 historical data of a time series is converted into a natural language training set comprising natural language input-output pairs. Each natural language input-output pair comprises an input description describing the time series in a first time period and a corresponding output description describing a forecast for the time series in a second time period.

At block 620 the natural language training set comprising the natural language input-output pairs is input into a neural network which is configured to implement a natural language processing (NLP) engine.

At block 630, the natural language training set is used to train the neural network to generate a natural language output making a time series forecast in response to receiving a natural language input describing historical data of the time series. In this way, by learning from the training set, the neural network is able to provide natural language forecasts for a time series.

The input description may comprise one or more sentences or phrases and the output description may comprise one or more sentences or phrases. During training, the input description thus acts as a natural language prompt and the output description acts as the target natural language.

Training the neural network may comprise inputting the input description of an input-output pair into the NLP engine in the neural network, using the neural network to generate output natural language based on the input description, comparing the generated output natural language to the output description of the input-output pair in order to calculate a loss function value and adjusting weights of the NLP engine in the neural network by back propagation. The trained neural network may then be deployed or provided to users, for instance by making the trained neural network available on a server or allowing it to be downloaded onto user devices.

The historical data may be converted into a natural language training set by using a natural language template including a pre-defined input description having one or more gaps and a pre-defined target description having one or more gaps. In the conversion process, one or more gaps of the predefined input description may be populated with historical data of the time series from a first time period and one or more gaps of the predefined target description may be populated with historical data of the time series from a second time period.

For example, column 550 in FIG. 5 shows an example of a populated language template including a input description 510 (the first four rows) and an output description 520 (the final row). The populated language template thus provides a natural language input-output pair in which the input description is "Place-of-Interest (POI) 81 is an Optical Goods Store. From Aug. 26, 2020, Wednesday to Aug. 28, 2020, Friday, there were 42, 32, 29 people visiting POI 81 on each day. On Aug. 29, 2020, Saturday,"; and the output description is "there will be 21 people visiting POI 81.". By converting the historical data into a plurality of input-output pairs, the NLP engine may be trained against these input-output pairs to provide reasonably accurate time series forecasts when presented with new input data in the inference phase.

From the above, it will be understood that the language template may be used in the training phase to create the natural language training set from input historical data. The inference phase may in some cases use the first part of a language template to convert input historical data into a natural language to be input to the NLP engine.

The input description may include a time series identifier, one or more historical time values, one or more time series data points corresponding to the one or more historical time values and one or more target prediction time values indicating one or more time values for which a forecast is requested. The language template may thus include one or more gaps which are to be populated by a time series identifier, historical time values, data points corresponding to the historical time values and a target prediction time value. The natural language processing engine is trained to generate natural language describing the time series forecast for the target prediction time (e.g. describing a predicted value of the data point at the target prediction time).

FIG. 5 shows an example of historical data for one time series: the time series of POI 81. However in the training phase historical data relating to a plurality of time series may be used to form the training set (e.g. historical data relating to a plurality of POIs). The historical data may thus include a plurality of time series, each time series having an identifier identifying a subject of the time series. The subject of a time series may for example be a client, a location, a point of interest (POI), a person or a sensor and may be given a unique identifier.

The historical data may further comprise contextual data. The contextual data may relate to a subject of the times series, one or more time values of the time series, or one or more data points of the time series. The historical data may include multiple different types of contextual data. The neural network may be able to use the contextual data to enhance the accuracy of the forecasting model, for example by learning correlations between different time series (e.g. different POIs) having the same or similar contexts. For instance, restaurants may have similar patterns of human traffic or POIs in the city centre may be busier at certain times of day or on weekdays. Likewise the neural network may be able to use contextual data to learn correlations between data points (such as number of visitors) at different times but having similar background conditions (such as sunny vs rainy weather).

F: Further Examples of Time Series

FIG. 5 gave the example of a time series relating to human mobility in which the time series was used to forecast the number of visitors to a POI. It will be appreciated that in other contexts a similar time series could be used to forecast the density of human or vehicle traffic at a particular location. Another example of a human mobility time series is a time series to predict a next location or next movement of a particular person. Table 1 below gives an example of data that may be used to form time series for forecasting a next POI to be visited by a person. Such forecasting could for instance be used by a person digital assistant on a mobile device.

TABLE 1

| Time series for forecasting next POI | | | | |
| --- | --- | --- | --- | --- |
| User ID | Visited POI ID | Visited POI Category | POI Location | Visited Time |
| 1 | 123 | Coffee Shop | Lat: 53.3648119 Lon: −2.272346583 | Jun. 30, 2020, Tuesday 8 am |
| 1 | 88 | Restaurant | Lat: 53.364905 Lon: −2.270824 | Jun. 30, 2020, Tuesday 3 pm |
| . . . | | | | . . . |
| 1 | 56 | Education | Lat: 53.3663709833 Lon: −2.2700764333 | Aug. 3, 2020, Monday, 1 pm |
| 2 | 57 | Postal Services | Lat: 53.3675663377 Lon: −2.278631763 | Jun. 30, 2020, Tuesday, 10 am |
| 2 | 123 | Coffee Shop | Lat: 53.3648119 Lon: −2.272346583 | Jul. 1, 2020, Wednesday, 11 am |
| . . . | | | | . . . |

In Table 1, the user ID refers to an individual and may for instance be linked to their mobile phone. The user ID acts as an identifier of each time series. Each individual may be considered to have their own time series of visited POIs. The time series for each individual (client ID) may comprise the visited POI IDs which act as the data points of the time series and the corresponding visit times which may act as the time values of the time series. In some cases, the visit times may be mapped to particular time windows or periods which act as the time values. The category of the visited POIs and the location of the visited POIs may act as contextual data which provide additional context to the data points. In some cases the actual location may be mapped to particular regions or areas to form the contextual data, while in other examples the raw location data may be used. The contents of Table 1 may form historical data of a time series and may be converted to natural language to create a training set to train the NLP engine. In the inference phase, historical data relating to a particular user may be converted into natural language to form an input description for NLP engine.

An example of a language template which may be used to convert the historical data of Table 1 into natural language is as follows:

Input description: "User {1} visited POI {123} ({a coffee shop}) on { June 30, 2020, Tuesday 8 am}, POI {88} ({a restaurant}) on { June 30, 2020, Tuesday 3 pm}, .... On {July 22, 2020, Wednesday, 10 am},"
Output description: "the user will visit POI {256}, which is a {Shopping Mall}."

In another example, a time series may be used to model electricity consumption. Table 2 below gives an example of historical data of a time series for forecasting electricity consumption.

TABLE 2

| Client ID | Consumption Values (KWh) | Time |
|---|---|---|
| Electricity Consumption | | |
| 1 | 13 | Jun. 30, 2020, Tuesday |
| 1 | 12.5 | Jul. 1, 2020, Wednesday |
| . . . | . . . | . . . |
| 1 | 16 | Aug. 3, 2020, Monday |
| 2 | 22 | Jun. 30, 2020, Tuesday |
| 2 | 26.7 | Jul. 1, 2020, Wednesday |
| . . . | . . . | . . . |

In this example the client ID is a time series identifier and may for instance refer to a particular household. The consumption values are the data points and the time values the days corresponding to the data points. In other examples, data points may be taken over different time periods for example, hours, weeks, months etc. In other examples, the data may refer to particular cities, geographic regions or electricity demand at particular power stations etc., in which case the identifier will refer to the city, geographic region or power station etc. While not shown in the table above, contextual data in this case could include a number of people in a household or area of the house, size of a city, weather conditions or time of year (e.g. season) etc.

An example of a language template which may be used to convert the historical data of Table 2 into natural language is as follows:

Input description: "From {June 30, 2020, Tuesday} to {July 14, 2020, Tuesday}, client {1} consumed {13, 12.5, ...., 12.3} KWh electricity on each day. On { July 15, 2020, Wednesday},"
Output description: "this client will consume 18.9 KWh electricity."

In another example, a time series may be used to model weather or other environmental conditions. Table 3 below gives an example of historical data of a time series for forecasting electricity consumption.

TABLE 3

| Location ID | Average Temperature (degrees Celsius) | Date |
|---|---|---|
| Weather | | |
| 1 | 24.6 | Jun. 30, 2020, Tuesday |
| 1 | 28.9 | Jul. 1, 2020, Wednesday |
| . . . | . . . | . . . |
| 1 | 27.3 | Aug. 3, 2020, Monday |
| 2 | 29.1 | Jun. 30, 2020, Tuesday |
| 2 | 30.2 | Jul. 1, 2020, Wednesday |
| . . . | . . . | . . . |

In this example the location ID is a time series identifier and may refer to a particular geographic location. The average temperature values are the data points and the time values are the days corresponding to the data points. In other examples, data points may be taken over different time periods for example, hours, weeks, months etc. In other examples, instead of temperature, the data point could be humidity, level of rainfall, semantic description of the weather or a numerical code defining the type of weather, a similarity index measuring similarity of the weather to weather in a different time period or another location, a measure of air quality or pollution such as PM2.5 etc.

An example of a language template which may be used to convert the historical data of Table 3 into natural language is as follows:

Input description: "From {June 30, 2020, Tuesday} to {July 14, 2020, Tuesday}, the average temperature of location {1} was {24.6, 28.9 ...., 25.3} Celsius degree on each day. On {July 15, 2020, Wednesday},"
Output description: "the temperature will be 28.9 Celsius degree."

While not shown in the table above, contextual data in this example could include geo-location coordinates of each location or a more general indication of the geographic region such as state, country or whether it is in the northern hemisphere or southern hemisphere etc. Contextual data may also include weather conditions other than the main data point (in this case temperature), which may be thought to correlate with the main data point of the time series.

In other examples, a time series may be used to model sensor readings. For instance a sensor associated with mechanical or electrical equipment, a factory or industrial process etc. Table 4 below gives an example of historical data of a time series which tracks the temperature of an electrical transformer. Such time series may for instance be used to forecast when certain safety or operational thresholds will be exceeded.

TABLE 4

| Sensor ID | Temperature (degrees Celsius) | Date Time |
|---|---|---|
| Electricity Transformer Temperature (e.g., for Sensor Monitoring) | | |
| 1 | 30.53 | 2016 Jul. 1 00:00:00 |
| 1 | 29.79 | 2016 Jul. 1 01:00:00 |
| . . . | . . . | . . . |
| 1 | 38.26 | 2016 Jul. 12 11:00:00 |
| 2 | 29.15 | 2016 Jul. 1 00:00:00 |
| 2 | 30.23 | 2016 Jul. 1 01:00:00 |
| . . . | . . . | . . . |

An example of a language template which may be used to convert the historical data of Table 4 into natural language is as follows:

Input description: "From {2016-07-01 00:00:00} to {2016-07-03 01:00:00} the temperature of sensor {1} was {30.53, 29.76 ...., 27.39} Celsius degree on each hour. On {2016-07-03 02:00:00},"
Output description: "the sensor temperature will be 30.92 Celsius degree."

While not shown in the table above, contextual data in this example could include environmental weather conditions and temperatures and/or the background environment temperature around each sensor etc.

G: Neural Network

The methods and systems described above may be implemented on a neural network. In some examples, the neural network may be trained on natural language alone, while in other examples the neural network may include both a natural language branch and an auxiliary branch comprising a numerical time series predictor.

FIG. 7 shows an example of a neural network 700 comprising a natural language processing branch 710 and a numerical time-series prediction branch 720. The natural language processing branch 710 is configured to generate output natural language forecasting a time series in response to input natural language describing historic data of the time series. The time-series prediction branch 720 is configured to generate predicted time series data in response to an input comprising historic data of the time series data. The natural language processing branch 710 and the time-series prediction branch 720 may be connected by a combined loss function 730 which combines outputs of the natural language processing branch and the time-series prediction branch.

The neural network may be trained by the method of FIG. 6 or any of the training methods described above. Where the neural network has a natural language processing (NLP) branch and a time series branch, the neural network 700 may be trained by a method comprising inputting the natural language training set into the (NLP) branch and inputting the historic data into the time-series prediction branch. The outputs of the natural language processing branch and the time-series prediction branch may then be determined and the neural network may be trained by applying a combined loss function to the outputs of the natural language processing and time-series prediction branches.

Figure 8A:
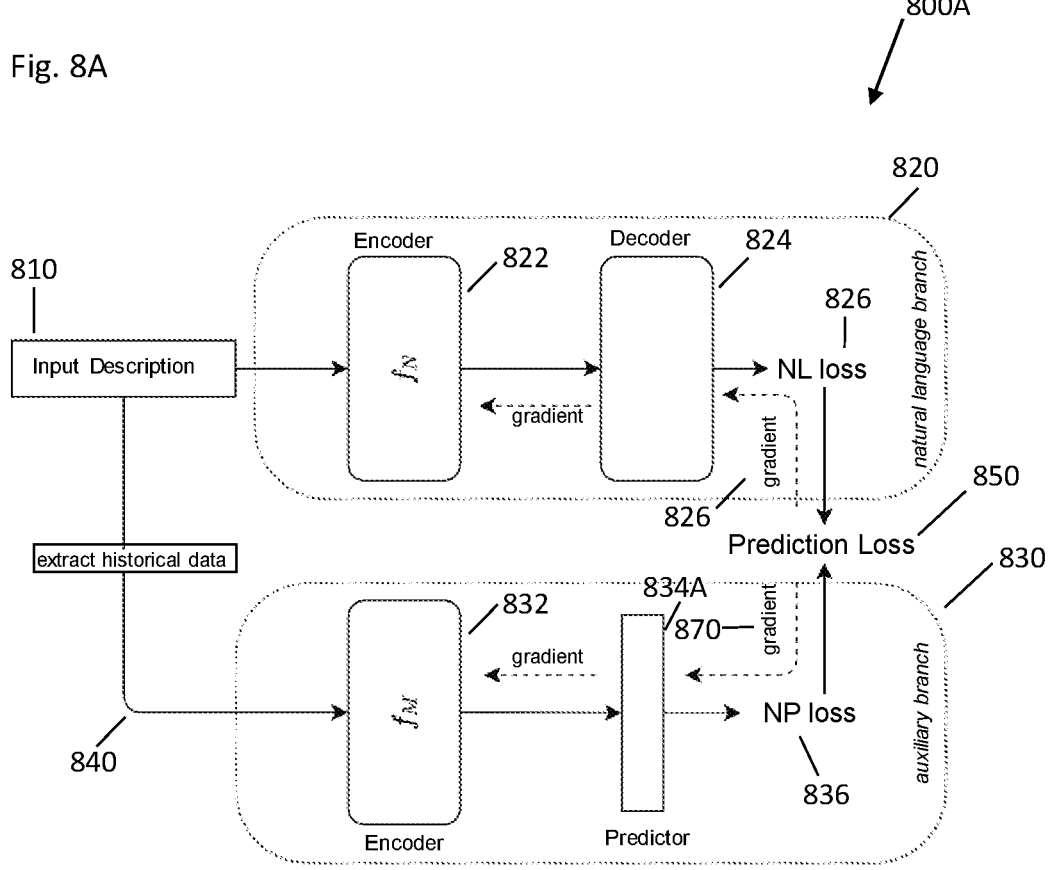
FIG. 8A is a schematic diagram a neural network having a natural language processing branch and an auxiliary branch having a combined loss function according to one example.

FIG. 8A shows an example of a neural network 800A having a natural language processing branch 820 and a numerical time-series prediction branch 830 (the "auxiliary branch"). A input description 810 comprising natural language describing historical data of the time series is input to the natural language (NL) branch 820 and processed by an encoder 822 and a decoder 824 of the NL branch, which may have a Transformer structure. In a training phase, the output generated by the decoder 824 is compared to the output in the training set and a loss for the NL branch (the "NL loss" is calculated based on the difference. The same historical data of the time series is input to the auxiliary branch 830; for example the historical data may be extracted 840 from the input description or may be sourced directly from a database, or user input etc. The historical data 840 is passed through an encoder of the auxiliary branch, which may comprise a plurality of encoders or embedding modules as shown in FIG. 1A, and on to a numerical time series predictor of the auxiliary branch. The encoder and predictor may have a Transformer structure. In a training phase, the output generated by the predictor 834 is compared to the target historical data in the training set and a loss for the auxiliary branch (the numerical predictor or "NP loss") is calculated based on the difference.

The NL loss and the NP loss are combined to produce a combined loss 850. A gradient 870 is calculated based on the combined loss 850 and back propagated through the NL branch and auxiliary branch to adjust the weights of the NL branch and the auxiliary branch. By training the neural network in this way the NL and auxiliary branches are connected by a combined loss function.

Figure 8B:
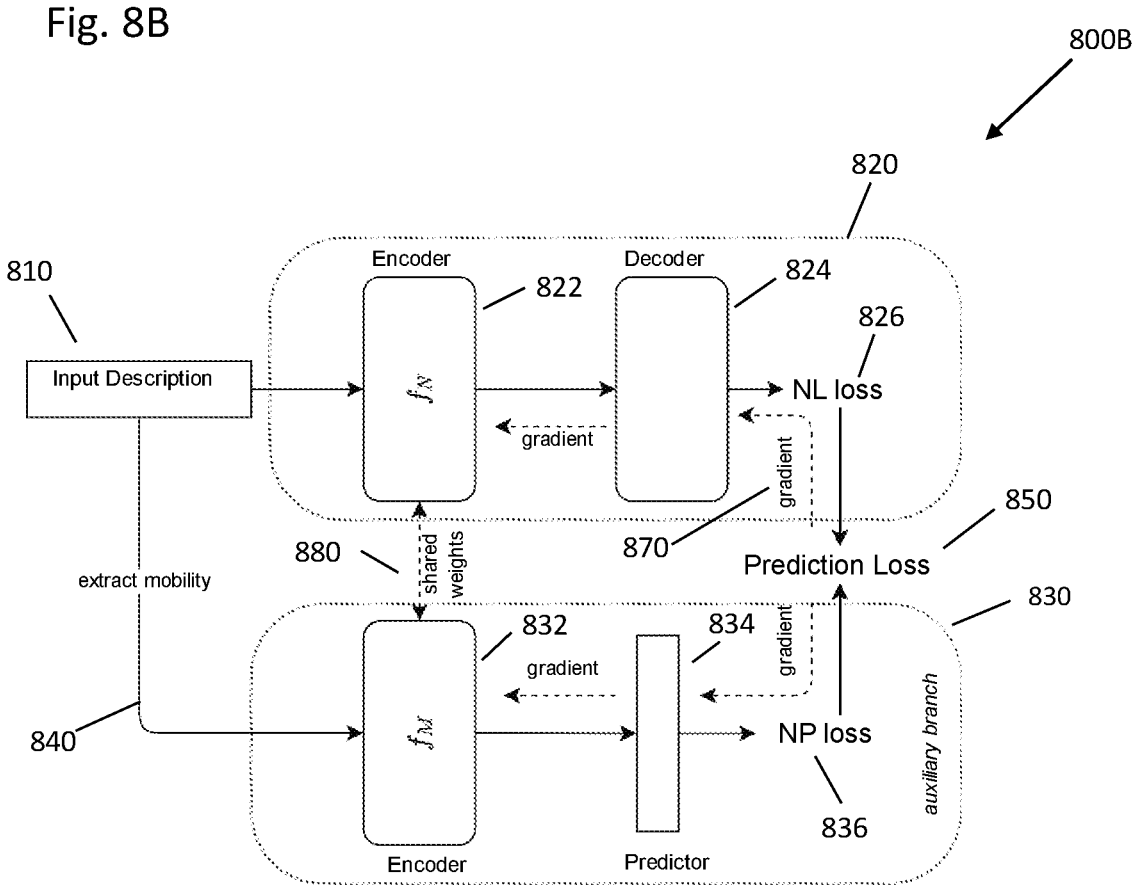
FIG. 8B is a schematic diagram a neural network having a natural language processing branch and an auxiliary branch having a combined loss function and shared weights according to one example.

In the example of FIG. 8A, the weights of the NL and auxiliary branches are effectively independent, although they are both modified by the same combined loss function during training. FIG. 8B, shows an example of another neural network 800B, which is the same as the neural network of FIG. 8A (like reference numerals denote like parts), except that the weights of the NL and auxiliary branches in the network are synchronised to be the same as shown by reference numeral 880. This may be referred to as "Siamese mode". However, the forecast accuracy of the Siamese mode was found to be less than the independent mode of FIG. 8A.

Figure 8C:
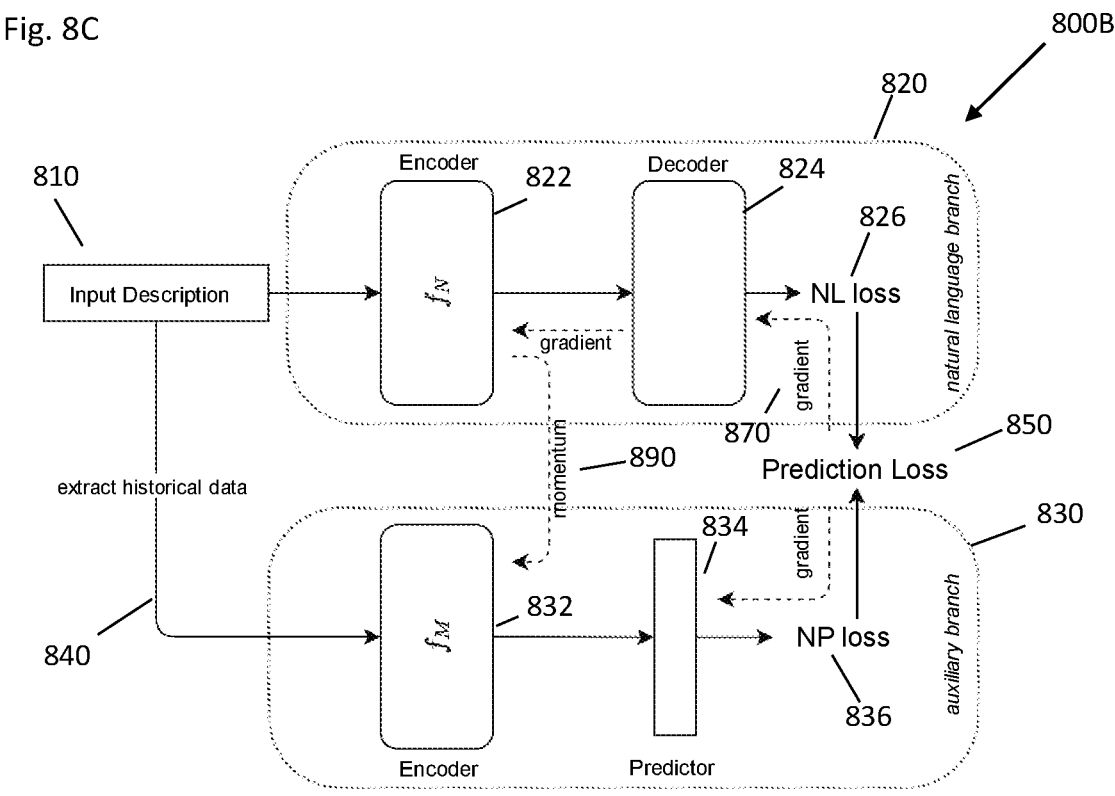
FIG. 8C is a schematic diagram a neural network having a natural language processing branch and an auxiliary branch having a combined loss function and linked by a momentum function according to one example.

In another example, the natural language processing branch and the auxiliary branch may be linked by a momentum function. FIG. 8C shows another example of a neural network 800C, which is the same as the neural network of FIG. 8A (like reference numerals denote like parts), except that the weights of the NL and auxiliary branches are linked by momentum function 890.

A moment function is a function which links the main branch and an auxiliary branch of a neural network. For instance, during training a momentum function may update the weights of the auxiliary branch based in part on the weights of the main branch and in part on the previous weights of the auxiliary branch.

As shown in FIG. 8C, the natural language processing branch 820 may include an encoder 822 and a decoder 824 and the time-series prediction branch 830 may include one or more encoders 832 and a numerical predictor 834. The encoder 822 of the natural language processing branch may be linked to the encoder(s) 834 of the auxiliary time-series prediction branch by a momentum function 890.

In one example, in the training phase, weights of the NLP branch may be updated by back propagation and weights in the auxiliary branch may be updated by the momentum function. The momentum function may determine a weight for the auxiliary branch based partly on previous weights in the auxiliary branch and partly on the corresponding weights in the NLP branch (which have just been updated by back propagation). For instance the weights for the auxiliary branch may include a component which is equal to a corresponding weight on the NLP branch multiplied by a momentum factor and may include another component which is based on a previous weight in the auxiliary branch.

In some examples, the momentum function has a momentum factor between 0.001 and 0.1. These values of momentum factor have been found to provide superior forecasting accuracy.

In some examples, the combined loss function may have a loss of 0.1 or less. These values of loss function have been found to provide superior forecasting accuracy.

In some examples, the time series may comprise a sequence of observations and the number of observations in the historic data set may be in the range of 5 to 20 observations. The number of observations refers to the number of data points in the historical data (each data point corresponding to a different time value). It has been found that in many scenarios, the forecasting accuracy is best when the historic data set has a number of observations within the range 5 to 20.

A smaller number of observations may be insufficient to learn patterns well, while very large numbers of observations may make it difficult to discover patterns. Thus, in some examples, in the inference phase the number of observations in the historical data used to generate the input description may be kept within the range 5 to 20. In some examples, in the training phase, the number of observations used to generate each natural language input-output description pair may be kept in the range 5 to 20. The training set may be formed from historical data having a much larger number observations for a particular time series, e.g. 100 or more, but this larger number of observations may be split up into different input-output description pairs; e.g. with a sliding window being used to generate a plurality of input-output pairs from the historical data. For example, observations 1-20 may be used to generate a first input-output description pair, observations 21-40 may be used to generate a second input-output description pair etc.

H: Applications

The forecasting systems and methods disclosed in the present application may find various applications. For instance, they may be helpful in forecasting weather, predicting electricity demand, levels of pedestrian or vehicle traffic, monitoring machinery or industrial processes and providing alerts before problems occurs, modelling and forecasting the progress of an epidemic etc. In some implementations, a computing system may be configured to automatically control a physical process or initiate an electronic transaction based on the output of a neural network which has been trained to implement a natural language processing engine for forecasting a time series, as described in the various examples above.

The natural language processing (NLP) engine outputs natural language describing the time series forecast. However, in some cases it may be desirable to have a numerical output which can be processed by other computing devices or used as a parameter to control apparatus. Accordingly, a computing system or device may be configured to extract numerical data from the output natural language and produce an output based on the extracted numerical data. In this way the computing system or device may take advantage of the flexibility and forecast accuracy of the NLP engine, but output numbers, graphics or audio based on the output of the NLP engine.

When the natural language processing engine is implemented by a neural network comprising a natural language processing branch and a (numerical) time-series prediction branch which is connected to the natural language processing branch by a combined loss function, the time-series prediction branch may be configured to output a time-series forecast in numerical form. In such cases, a computing system or device may be configured to output numerical data, graphics or audio based on time-series forecast output by the time-series prediction branch. That is the NLP branch and time series prediction branch may be trained together to enhance accuracy, but the computing system or device may take numerical output from the time series prediction branch, which numerical output can be more easily used by computing systems and software. The system or device may be configured to automatically control a physical process or initiate an electronic transaction based on the numerical data. For instance, the system or device may be configured to automatically control a machine, electricity generator, buy or sell shares, order stock etc.

One possible application of the time series forecasting is as a virtual assistant, for instance a virtual assistant on a mobile or other computing device. For instance, the virtual assistant may receive a question relating to the time series, such as "how many customers will come to my shop tomorrow?" and use the time forecasting method described herein to respond.

In one example, an app or virtual assistant module may be implemented by computer readable instructions executed by one or more processors of a computing device. The virtual assistant module may be configured to receive a natural language question. For instance, the virtual assistant module may receive the natural language question through speech or typed input by the user. The virtual assistant may be configured to determine a time series identifier, such as a client ID or a point of interest (POI), which is relevant to the natural language question. For instance, the relevant time series identifier may be determined from the natural language question itself, or may be pre-set. For example, the time series identifier may be linked to the user account or mobile device or may have been input to an application running on the computing device. The virtual assistant module may obtain historical data of a time series which is relevant to the natural language question and the determined time series identifier (e.g. client ID or POI). For instance the virtual assistant module may obtain historical data from a database which is relevant to the question, such as data points and contextual data relating to the time series identified by the identifier and relevant to a time period specified in the natural language question. The virtual assistant module may then sending the obtained historical data to a converter module for conversion into natural language for input to the natural language processing engine.

I: Further Examples

According to one example of the present disclosure a method comprises: receiving natural language describing historical data of a time series; inputting the natural language describing the historical data to a natural language processing engine which has been trained on plurality of input-output description pairs, each input-output description pair comprising an input description describing the time series in a first time period and a corresponding output (target) description forecasting the time series in a second time period; generating, by the natural language processing engine, output natural language which describes a forecast for the time series based on the natural language describing the historical data; wherein the natural language processing engine is implemented by one or more processors. For instance, this method may be performed by the server shown in FIG. 3C.

According to one example of the present disclosure a method comprises obtaining historical data of a time series; converting, by a converter module, the historical data of the time series into natural language describing the historical data; sending the natural language describing the historical data to a natural language processing engine; and receiving from the natural language processing engine, output natural language which describes a forecast for the time series based on the natural language describing the historical data; wherein the converter module is implemented by one or more processors. For instance, this method may be performed by the client device shown in FIG. 3C.

The various methods described in this application may be implemented by one or more computing devices comprising one or more processors and a non-transitory machine readable medium storing instructions executable by the one or more processors to perform the method. Some examples of the present disclosure provide a non-transitory computer readable storage medium storing machine readable instructions which are executable by a processor to perform one or more of the methods described herein. Some examples of the present disclosure provide a computing system for forecasting a time series comprising: one or more processors and a memory storing computer executable instructions, which when executed by the one or more processors, cause the computing device to perform the method.

J: Detailed Experimental Data

A system and method of forecasting a time series according to the present disclosure was tested on mobility data. The testing method and results are explained below.

J1 Method

J1.1 Problem Formulation. In this example there is a set of POIs (place-of-interests) in a city: $U = \{u1, u2, \ldots, up\}$. Each POI $u1$, $u2$, etc. is a time series identifier. For each POI $u$, $cu$ stands for the semantic category information (a form of contextual data), such as a restaurant or a park. The number of visits in a day $t$ of POI $u$ is represented as $$x_t^u.$$

The human mobility forecasting problem is defined as a time series as follows. Given the history record of visiting numbers $$X^u = \left[ x_{t_1}^u, x_{t_2}^u, \ldots, x_{t_{obs}}^u \right]$$

form data points of a time series, the goal is to predict the number of visits $$\hat{x}_{t_{obs+1}}^u$$

for the next day $t_{obs+1}$. The ground truth of visiting number is represented as $$x_{t_{obs+1}}^u$$

and obs stands for the observation length of the given history visiting record. For simplification, the superscript u (indicating the POI id) is ignored in the description below.

J1.2 Mobility Description

In the proposed forecasting via language generation pipeline, one step to be addressed is how to describe the mobility data (available in the numerical format) in natural language. This mobility-to-language transformation provides the input description (e.g. source sentences) and the output description (e.g. destination sentences) for the natural language processing engine (hereinafter referred to as the "mobility translator").

Therefore, we developed a simple yet effective template-based method for converting historical data of a time series into a mobility description. The table of FIG. 5 demonstrates the mechanism of the proposed mobility description method for converting historical data of the time series into natural language. Generally, there are two parts included: input description generation and output description generation. For the input description, it produces prompts that serve as the input natural language sentences of the encoder (145 in FIG. 1B). As given in the table, the prompt consists of four elements:

POI Semantic: to give the POI id (a time series identifier) and describe the semantic category information (contextual information) of the POI;

Observation Time (time series data points): to indicate the timestamps of the observation period;

Mobility Data (data points of the time series): to transform the numerical mobility data into natural language, which is the essential part of the prompt;

Prediction Target (a prediction time value): to provide a cue of the prediction target timestamp tobs+1.

By linking all four elements together (the first four rows in the table of FIG. 5), the entire prompt is then generated.

Similarly, the output description part (used as the ground truth for training and evaluation) handles the targeting sentences which are the expected output of the decoder (150 in FIG. 1B). It has only one sentence and focuses on the prediction goal xtobs+1. One example of the output description is given in the last row of the table.

Depending on the available data or the application, other sentences for describing extra contextual information for mobility prediction such as holiday information (e.g., Tuesday is Boxing Day.) and weather conditions (e.g., There were showers on Thursday.) could also be easily appended in the prompt. For the conventional numerical time-series forecasting frameworks, in order to take various types of extra information into consideration, it is necessary to explicitly design and introduce extra modules or layers to fuse external information. On the contrary, the proposed language generation-based mobility prediction method only needs to update the prompts instead of adding extra layers or tweaking the model architecture. This reflects the flexibility of the proposed forecasting via language generation pipeline.

J1.3 Two-Branch Structure

The overall framework of the proposed method is illustrated in FIG. 8C. Hereinafter we refer to our proposed method, model and system as SHIFT. FIG. 8A and FIG. 8B are two variants of our SHIFT method and more details of these are given in Section J1.3.3. The model comprises two branches: (1) Natural Language Branch (NL): a branch with the sequence-to-sequence structure, which is the main branch of SHIFT to translate the input prompt to generate output sentences; (2) Auxiliary Mobility Branch (Mob): an auxiliary branch to strengthen the ability of SHIFT in learning mobility patterns for forecasting.

The details of SHIFT are given in the following sections.

J1.3.1 NL Branch. Through mobility description, mobility data X and other contextual information (e.g., semantic category c) are transformed as a natural language prompt S. In addition, the prediction target xtobs+1 is also described as a target sentence Y. Following standard natural language processing procedures, tokenization is then applied to the generated prompt sentences.

After the tokenization, the prompt S is interpreted as a list of tokens $[s_1, s_2, \ldots, s_J]$, where J is the length of the list. Each token (element in the list) belongs to a vocabulary where saves the token mapping of the entire dataset. Similarly, the target sentence Y (i.e., the sentence given in the last row of the table of FIG. 5) is encoded into $[y_1, y_2 > \ldots y_K]$ and K is the length of the target sentence tokens.

The whole NL branch follows the sequence-to-sequence/encoder-decoder structure and the encoding process can be formulated as:

$$e_n^j = \phi_n(s_j; W_{\phi n}), \tag{1}$$

$$h_N = f_N\left(e_n^1, e_n^2, \ldots, e_n^J; \theta_N\right), \tag{2}$$

where $\theta_n$ with weights $W_{\phi n}$ is an embedding layer to embed each input token into a d dimension vector $$e_n^j \in R^d.$$

The encoder fN($\cdot$) with trainable weights $\theta_N$ takes embedded vectors to yield a hidden state $h_N$ for the later decoder part. In our SHIFT, Transformer is utilized as the encoder fN($\cdot$).

The decoding part in our NL branch generates predicted tokens $[\hat{y}_1, \hat{y}_2, \ldots, \hat{y}_K]$ in a autoregressive fashion. Mathematically, the probability of decoding the k-th token $\hat{y}_k$ can be parameterized as:

$$p(\hat{y}_k \mid \hat{y}_{<k}, h_N) = softmax(f_D(\hat{y}_{<k}, h_N; \theta_D)), \tag{3}$$

where $f_D(\cdot)$ is the decoder in the NL branch. After decoding the total K tokens and applying detokenization on decoded tokens, a generated sentence $\hat{Y}$ is then obtained. We used Tokenizer provided by HuggingFace for handling the tokenizing and detokenizing: https://huggingface.co/docs/tokenizers/python/latest/.

J1.3.2 Mob Branch. Since we are particularly interested in forecasting human mobility (e.g., number of visits of each POI), an auxiliary mobility branch (Mob branch) is incorporated into the SHIFT framework. As described in the above section, the NL branch is a general sequence-to-sequence architecture for language generation, both mobility data related tokens (e.g., tokens represented the number of visits) and other tokens in the prompt will be treated equally. Therefore, the motivation of introducing this auxiliary branch is to support the main NL branch to better learning the mobility pattern.

For the architecture of this Mob branch (the auxiliary branch in each of FIGS. 8A to 8C), it follows the design of typical time-series forecasting framework. The input of this branch is the mobility data $[x_{t1}, x_{t2}, \ldots x_{tobs}]$ which can be extracted from the input mobility description (prompt) of the NL branch or directly taken from the dataset (the raw data before mobility-to-language transformation).

Similar to the NL branch, the input of each timestamp xtis first embedded into $$e_m^t \in R^d$$

through the embedding layer $\phi_m(\cdot)$:

$$e_m^t = \phi_m(x_t; W_{\phi m}) \qquad (4)$$

After the embedding, a Transformer-based encoder fM is used to extract the hidden state $h_M$:

$$h_M = f_M\left(e_m^{t1}, e_m^{t2}, \ldots, e_m^{tdn}; \theta_M\right), \qquad (5)$$

where θM is the weight matrix of the Transformer encoder in the Mob branch. The Mob branch prediction [18] xtobs+1 at time step tiobs+1 is then generated via:

$$\hat{x}_{t_{obs+1}} = MLP(h_M), \qquad (6)$$

where MLP($\cdot$) is a multi-layer perceptrons (MLP)-based predictor.

J1.3.3 Connecting Two Branches. In this section, we discuss how to connect the NL branch and the Mob branch in our SHIFT. For our SHIFT, the forecasting performance depends on the main NL branch. During the model inference phase, the Mob branch will be ignored as the output is in the sentence format. As a consequence, it is more important to learn a better $f_N(\cdot)$ for the NL branch. For this purpose, we introduce a Momentum Mode (as illustrated in FIG. 8C) to connect two encoders. In more detail, during the training process, only θN is updated through back propagation and θM is updated via:

$$\theta_M \leftarrow \alpha_m \theta_N \div (1 - \alpha_m)\theta_M. \qquad (7)$$

where αm is the momentum factor. Under this mode, the Mob branch encoder $f_M(\cdot)$ can be seen as the momentum-based moving average of the NL branch encoder $f_N(\cdot)$. Since $\theta_M$ is based on $\theta_N$, during the training, the auxiliary Mob branch could support the main branch to learn a more powerful $f_N(\cdot)$ in the aspect of encoding mobility data for forecasting.

In addition to the above momentum mode, we also explore and compare the other two ways of connecting the NL branch and the Mob branch: (i) Basic Mode (FIG. 8A): this mode is a vanilla mode. In this basic mode there are no interactions between the two branches except for the combined loss. (ii) Siamese Mode (FIG. 8B): the weights of two encoders in two branches are shared during training $(\theta_M = \theta_N)$.

The comparison of using different modes is given in Section J2.4.

It is worth noting that the final prediction target can be extracted from both the NL branch ($\hat{x}_{t_{ods+1}}$ acquired from the generated sentence $\hat{Y}$) and the Mob branch ($\hat{x}_{t_{obs+1}}$ in Eq. (6)). Considering that, in this example, we are primarily interested in testing the performance of forecasting through language generation, we used the output of the NL branch for evaluation. That is, in this example, the overall output of our SHIFT is the generated sentence $\hat{Y}$ from the NL branch and $\hat{x}_{t_{obs+1}}$ embedded in output sentence $\hat{Y}$ is used for evaluation.

J1.4 Loss Function

As the NL branch is for generating sentences, we use the conventional multi-class cross-entropy loss function (the number of class equals to the total number of tokens in the vocabulary) given by:

$$\mathcal{L}_N = -\sum_{b=1}^{B}\sum_{k=1}^{K} y_k^b \log \hat{y}_k^b, \qquad (8)$$

where B is the batch size and the superscript b stands for the b-th training sample in a batch. For the Mob branch, it is a basic time series forecasting branch Thus, we choose the typical mean squared error (MSE) as the loss function:

$$\mathcal{L}_M = \frac{1}{B}\sum_{i=1}^{B}\left\| \hat{x}_{t_{obs+1}}^b - x_{t_{obs+1}}^b \right\|^2. \qquad (9)$$

As a result, the final loss function of SHIFT is a combination of LN and LM:

$$\mathcal{L} = (1 - \alpha_{loss})\mathcal{L}_N + \alpha_{loss}\mathcal{L}_M, \qquad (10)$$

25 where $\alpha_{loss}$ is the loss factor to balance the two losses. The impact of setting different $\alpha_{loss}$ is discussed in Section J2.5.2.

J2 Experiments

J2.1 Dataset

We performed extensive experiments on real-world human mobility data presented by SafeGraph's Weekly Patterns {https://docs.safegraph.com/docs/weekly-patterns}, which includes visitor and demographic aggregations for POIs in the US. It contains aggregated raw counts (no private information) of visits to POIs from a panel of mobile devices and also provides the semantic category information of each POI. Although SafeGraph provides the data from many cities, we selected data from three major cities with different statistical features (see FIG. 9 and FIG. 10) for building three datasets: New York City (NYC), Dallas, and Miami.

Since some POIs only have visiting records for several weeks, we first filter out POIs without complete visiting records during the entire data collection period. The mobility-to-language template introduced in Section J1.2 is then applied to generate natural language sentences to form datasets. Each dataset is randomly divided into the training set (70%), validation set (10%), and testing set (20%). Table 2 shows the statistics (after filtering) of the datasets. Based on the table, it can be seen that three selected datasets have different levels in the total number of POIs, max number of visits, and the number of semantic categories. This ensures the representativeness of our data used for experiments.

J2.2 Implementation Details

The hidden dimension d for the Transformer is chosen as 256 for both the main NL branch and the auxiliary Mob branch. To avoid over-fitting, the dropout rate is set as 0.2. The hyperparameters are set based on the performance of the validation set. The total number of training epochs is 36 with batch size 128 (for the Dallas and Miami) or batch size 64 (for the NYC). The loss factor αloss and the momentum factor am are selected as 0.01 and 0.001, respectively.

The proposed methods are optimized with Adam optimizer (a 0.0001 initial learning rate with ReduceLROnPlateau decay) on a desktop with an NVIDIA GeForce RTX-2080 Ti GPU with PyTorch.

J2.3 Prediction Performance

J2.3.1 Baselines for Comparison. As comparison, we select 9 methods which are classified into two different categories:

Time-series forecasting methods: (1) basic linear regression (LR); (2) Gru: Gated Recurrent Units, one of basic RNNs; (3) GruA: Gru with attention mechanism; (4) Transformer: the vanilla Transformer structure. This can considered as a model only using the Mob branch of our SHIFT. (5) Re-former: an efficient variant of Transformer; (6) Informer: a state-of-the-art Transformer variant specifically designed for time-series prediction.

Natural language sequence-to-sequence structure (S2S): (1) using GruA network as the backbone; (2) using Transformer network as the backbone: this can considered as a model only using the NL branch of our SHIFT. (3) BART: a recent Transformer-based architecture which has a bidirectional encoder and an autoregressive decoder. It is designed for natural language sequence-to-sequence tasks. Note that the pre-trained weights of this network is not used in the experiments for fair comparison. The configuration of this model can be accessed through: https://huggingface.co/facebook/bart-base/tree/main.

For the first category methods, the typical time-series forecasting framework (FIG. 1A) is applied. The proposed forecasting through language generation pipeline (FIG. 1B) is utilized for the methods under the second category.

J2.3.2 Evaluation Protocol and Metrics. To evaluate the performance of different methods, we report two widely used metrics for prediction tasks: the Root Mean Square Error (RMSE) and the Mean Absolute Error (MAE). For the proposed SHIFT and other S2S-based methods, the direct outputs are sentences (e.g., the last row of the table of FIG. 5). Thus, ^xtobs+1 is firstly decoded from each output sentence before calculating RMSE and MAE. In the following experiments, we report the average performance (and the standard deviation) of runnings of each method (excluding LR) or configuration.

J2.3.3 Performance. FIG. 11 shows the results of different methods.

The average performance across all three datasets is also given in the last two columns of the table. In general, we observe that SHIFT consistently outperforms all baseline techniques in RMSE (12.4% performance gain, compared to the second best) and achieves the second best in average MAE (only about 0.2% worse than the best performer BART). Compared to other methods, SHIFT brings a significant RMSE improvement especially on the Dallas and Miami datasets which are more difficult (due to more POIs and larger range of the number of visits value) to predict. For the MAE metric, our SHIFT is the top performer on Dallas and other top performers are Informer and S2S (BART). Note that although S2S (BART) slightly outperforms our SHIFT on average MAE, the computational cost of S2S (BART) is significantly larger than SHIFT (see FIG. 12). These results demonstrate the effectiveness of the proposed SHIFT.

In addition, if we compare methods using the same network architecture, S2S (GruA) leads GruA with an improvement of 11.9% in RMSE and S2S (Transformer) outperforms Transformer by around 5.4% in RMSE. It can be seen that applying the proposed forecasting through language generation pipeline (S2S) is able to boost human mobility forecasting performance and S2S is robust to work with different prediction neural network architectures.

J2.4 Ablation Study

In this part, we conducted experiments on three datasets with ablation consideration. To evaluate each branch and different connecting modes of SHIFT, the following variants are compared:

Without the NL branch: the NL branch of SHIFT is disabled. This variant is the same as Transformer in FIG. 11.

Without the Mob branch: the Mob branch is removed. This variant is the same as S2S (Transformer) in FIG. 11.

SHIFT (basic): using Basic mode to connect two branches (details given in Section J1.3.3).

SHIFT (siamese): using Siamese mode to connect two branches (details given in Section J1.3.3).

The results of these variants and our SHIFT (using the default momentum mode) on the three datasets are given in FIG. 13. From FIG. 13, we can observe that: (1) The proposed SHIFT greatly outperforms the first two variants where only one branch is enabled. It justifies the need of incorporating both branches. (2) The momentum mode shows better performance than the basic and the siamese modes. Specifically, using the siamese mode has the worst performance. It is even worse than SHIFT (w/o Mob branch), which indicates that the auxiliary Mob branch has a negative effect on prediction performance under the siamese mode setting. Based on the above results, we conclude that the momentum mode is more suitable for the proposed two-branch SHIFT.

J2.5 Impact of Different Settings

J2.5.1 Different Prompts. In the proposed forecasting via language generation pipeline, the mobility description is an important factor. We explore the impact of different prompts on mobility forecasting performance. To be specific, two types of prompts are used as the input of our SHIFT:

Prompt A: This is the default prompt for the proposed method. It contains all the elements listed in the table of FIG. 5.

Prompt B: Compared to Prompt A, the sentence used for describing the POI semantic category information (the first row in the table of FIG. 5) is removed in Prompt B.

As given in FIG. 14, using Prompt A consistently produces performance improvements over using Prompt B on all three datasets. This indicates that incorporating external semantic information of POIs is also beneficial to the mobility prediction task under the forecasting via language generation pipeline.

Figure 15:
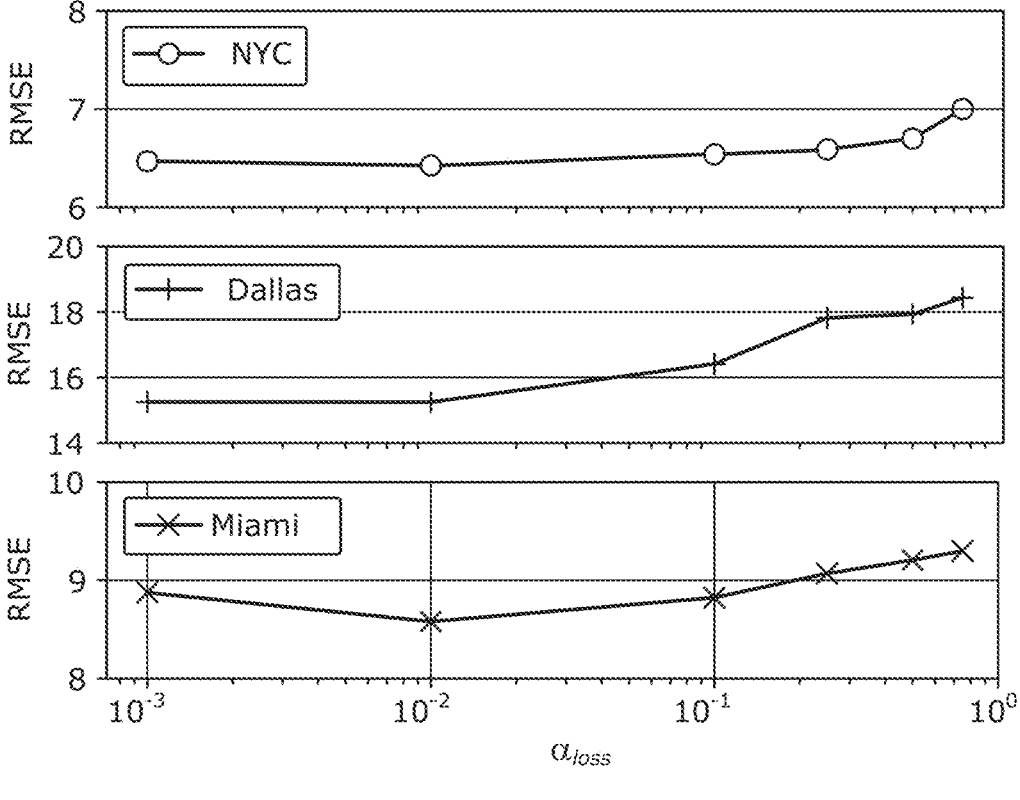
FIGS. 15 (*a*) to (*d*) are graphs showing the impact of loss factor and momentum factor on a forecasting method according to one example.
Figure 15:
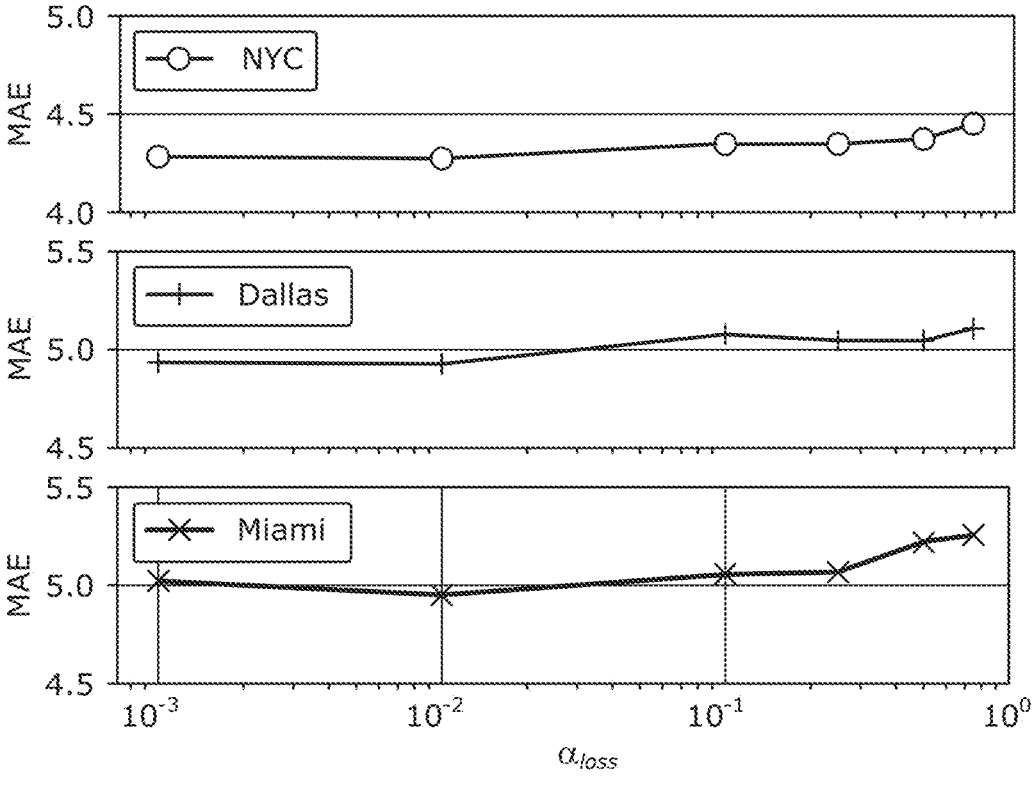
Figure 15:
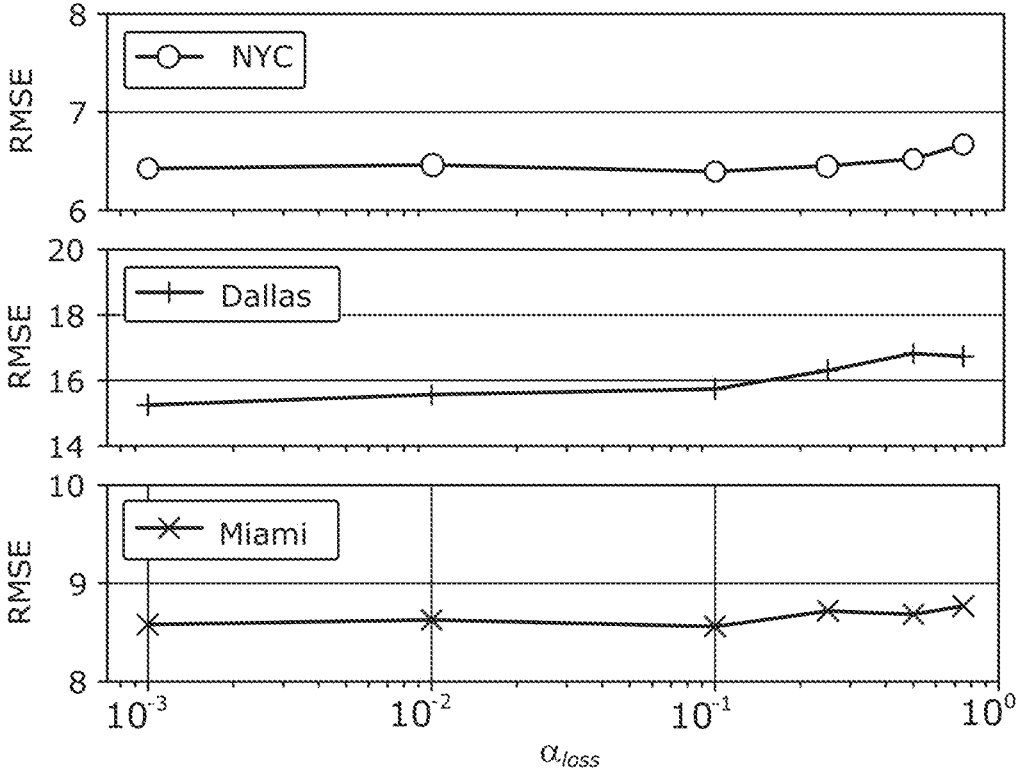
Figure 15:
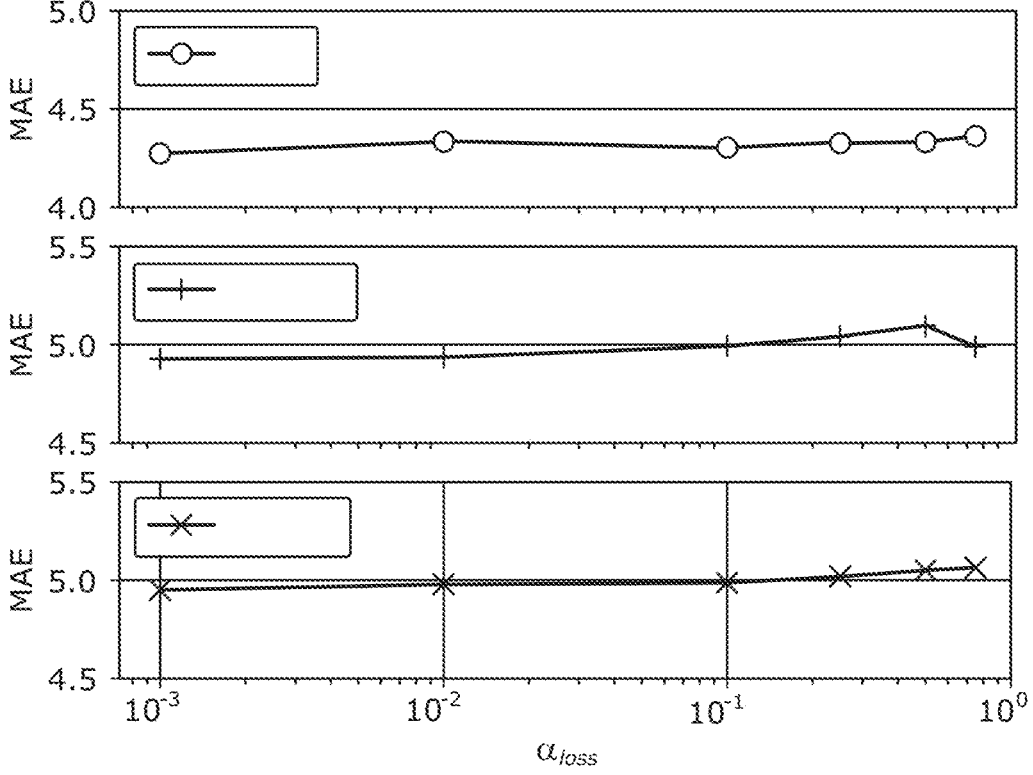

J2.5.2 Different Loss Factors. In this experiment, we analysis the impact of the loss factor $\alpha_{loss}$ on the performance of SHIFT by varying $\alpha_{loss}$ from {0.001, 0.01, 0.1, 0.25, 0.5, 0.75}. The average (of 5 runnings) RMSE and MAE of SHIFT with different @loss settings on all three datasets are shown in FIGS. 15 (*a*) and 15 (*b*) respectively. We can observe that a smaller $\alpha_{loss}$ (<0.1) leads to a well performance.

When a larger $\alpha_{loss}$ is applied, the prediction performance of SHIFT drops considerably. During the training of SHIFT, it can be noticed that LM (MSE loss) has a relatively larger value than $L_N$ (cross-entropy loss). Thus, a smaller $\alpha_{loss}$ could better balance these two loss terms, which results in a better prediction performance.

J2.5.3 Different Momentum Factors. In this part, we investigate the impact of the momentum factor by selecting am from {0.001, 0.01, 0.1, 0.25, 0.5, 0.75}. The average RMSE and MAE of 5 runnings using different am setting is given in FIGS. 15 (*c*) and (*d*) . . . . From these two figures, it can be seen that SHIFT performs reasonably well am is small (ranging from 0.001 to 0.1). When the am becomes larger, we observe that there is an increasing RMSE for NYC and Dallas, whereas the performance is relatively stable with all $\alpha_m$ values for the Miami dataset. From these results, although a smaller $\alpha_m$ (a slowly updating $f_M$ for the Mob branch) is beneficial, the impact of the momentum factor $\alpha_m$ is less than the loss factor $\alpha_{loss}$.

J2.5.4 Different Observation Lengths. In the last part, we evaluate the performance of SHIFT with different observation lengths. Specifically, we compare the performance of Transformer, S2S (Transformer), and SHIFT with the observation length as 5, 10, 15, 20, respectively.

Figure 16:
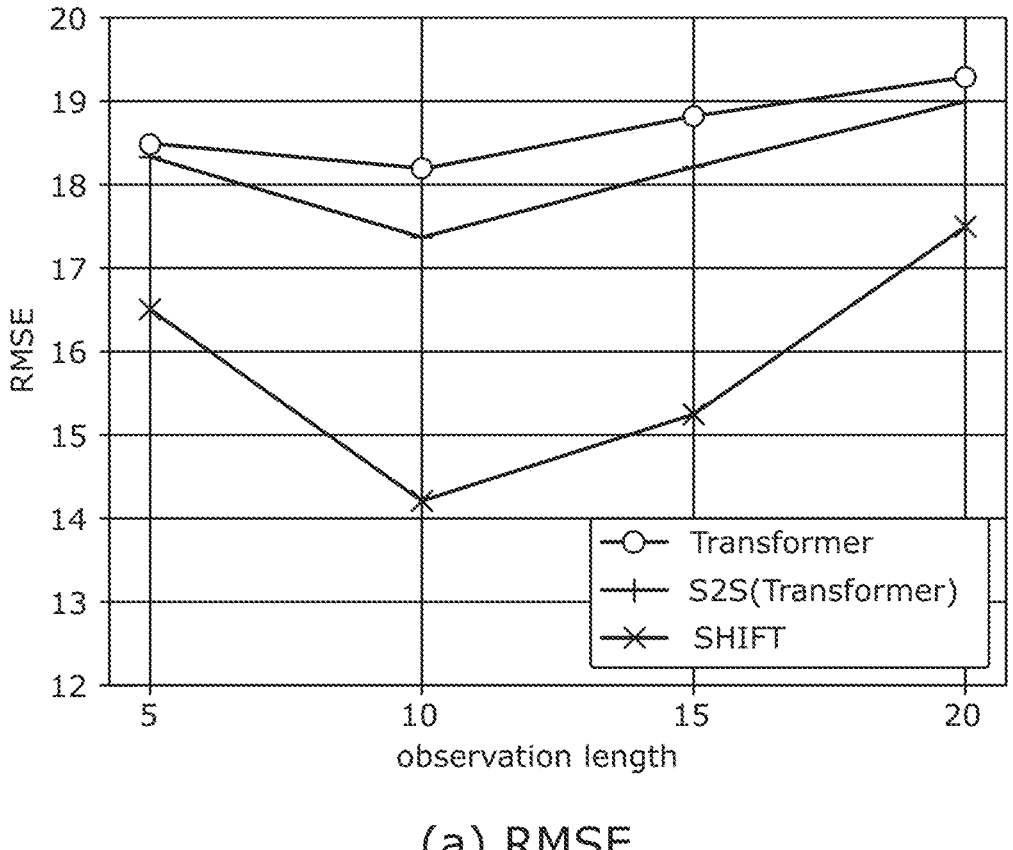
FIG. 16(*a*) and FIG. 16(*b*) showing the performance of a forecasting method with different observation lengths according to one example.
Figure 16:
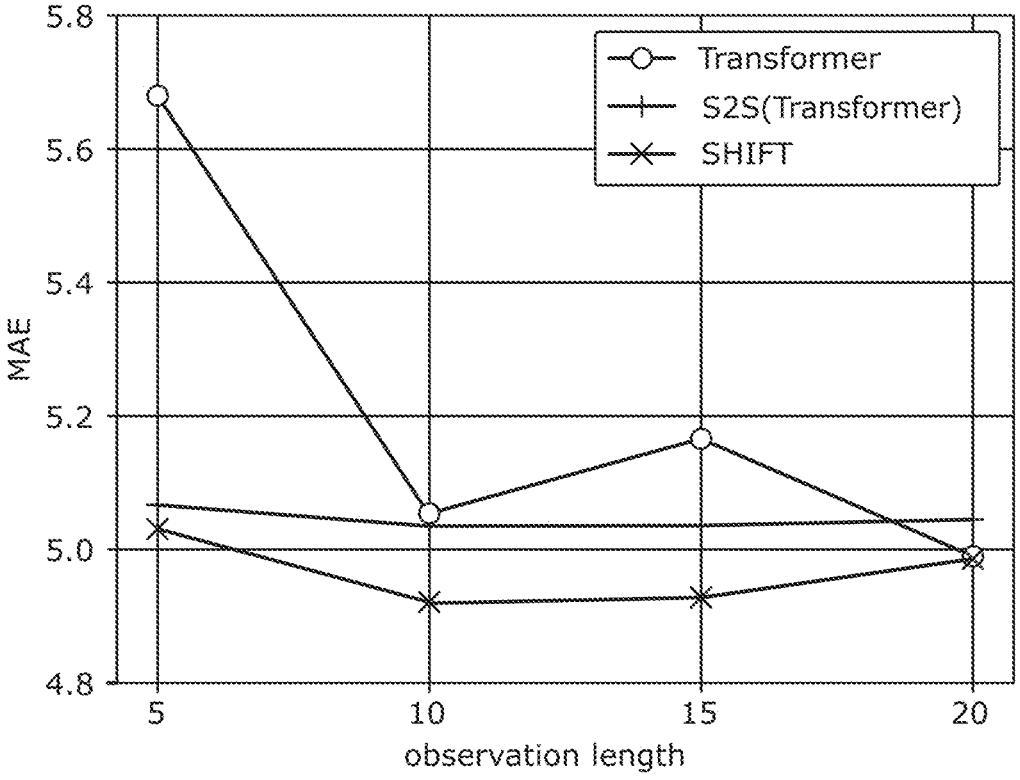

Due to the large amount of experiments (3 methods and 4 different observation lengths), we only report the performance (average of 5 runnings) using the challenging Dallas dataset in FIG. 16 (*a*) (RMSE).

FIG. 16 (*b*) (MAE). From the figure, it can be seen that our SHIFT outperforms both Transform and S2S (Transformer) on all different observation lengths. Such an observation demonstrates the superior prediction performance of SHIFT. We can also observe that all three methods have relatively worse results when the observation length is too small (obs=5) or too large (obs=20). A smaller observation length leads to fewer available history records to learn mobility patterns, whereas a very large observation length might also increase the difficulty to discover effective mobility patterns for prediction. It suggests that a favourable observation length for SHIFT is roughly one or two weeks.

J2.6 Visualization Analysis

Figure 17:
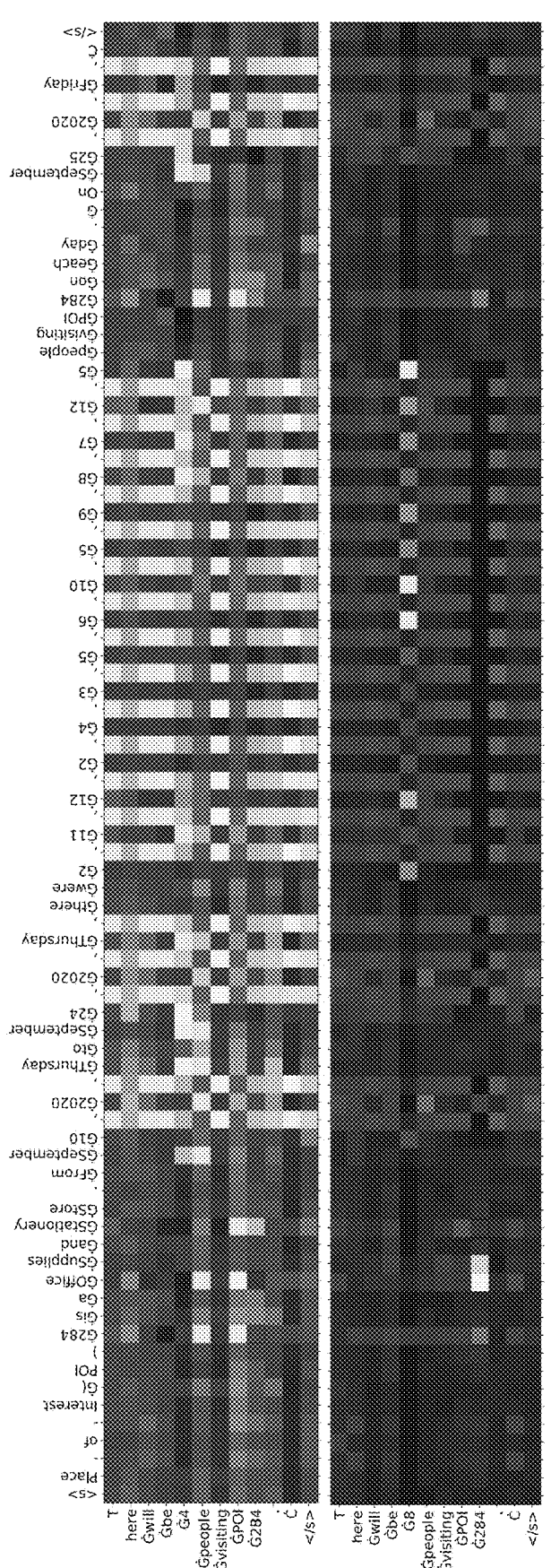
FIG. 17 is a graphic which visualizes attention of S2S (Transformer) and the attention of SHIFT according to one example.
Figure 17:
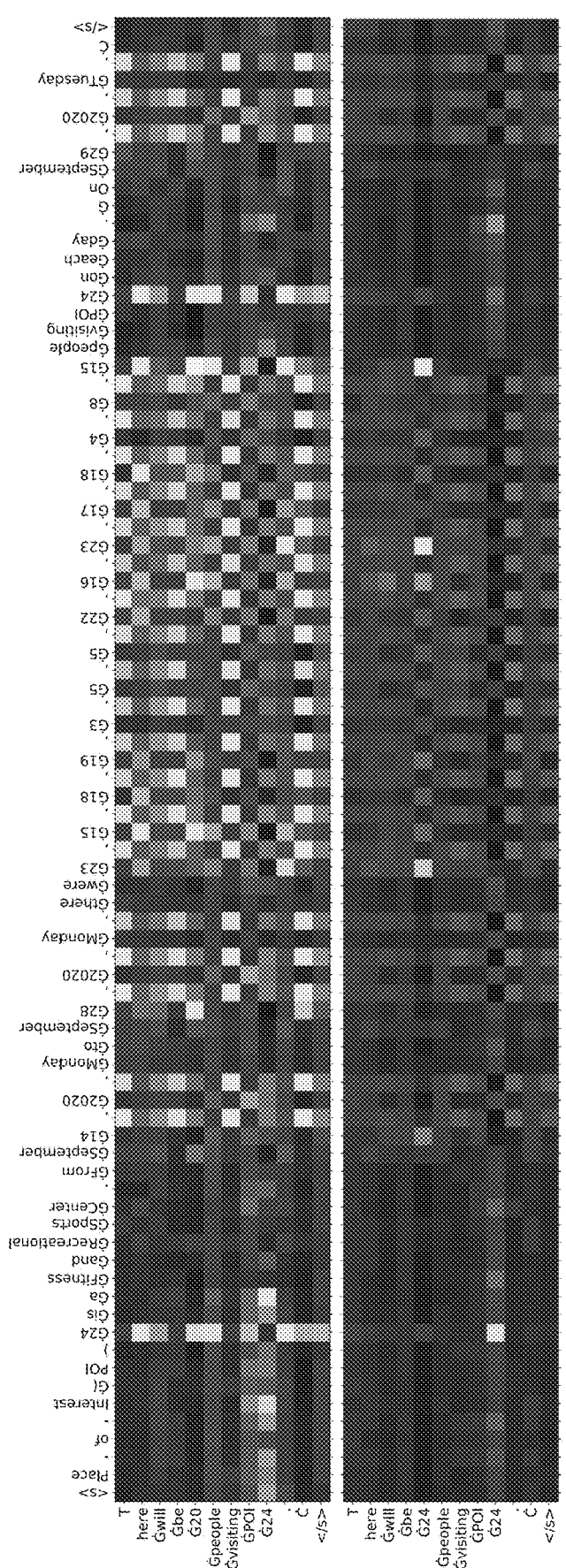

In FIG. 17, we visualize the attentions (between the input sentence and the output sentence) learned by the Transformer encoder-decoder architecture in SHIFT. The upper half of FIG. 17 is the first case and the lower half gives the second case. In each half (each case), the first row is the learned attentions of S2S (Transformer) (SHIFT without the Mob branch), whereas the second row illustrates the learned attentions of our SHIFT (both NL and Mob branches).

For each heatmap plot in which a hotter region means a larger attention value, the horizontal axis stands for the input prompt (in the token format) and the vertical axis represents the output sentence tokens. In more detail, <s>, </s>, C are the sentence starting token, sentence ending token, and padding token, respectively.

J2.6.1 Case Analysis 1. The ground truth label of this case is: There will be 9 people visiting POI 284. From the upper half of the figure, it can be seen that S2S (Transformer) generates There will be 4 people visiting POI 284 and the SHIFT predicts the number of visits as 8. As a comparison, the prediction of only using the Mob branch (Transformer method in FIG. 11) is 7.71. From the visualization of S2S (Transformer) and SHIFT, we observe that: (1) When generating the POI id (e.g., 284) in the output sentence, both models would look into not only the POI id given in the prompt but also the semantic information (e.g., higher attention values on the Office and Stationery tokens). (2) The attentions of S2S (Transformer) has an evener distribution across the input and output tokens, whereas the attentions learned by SHIFT focus more on the mobility data (the G8 row). Due to the Mob branch, SHIFT would particularly learn mobility patterns from the mobility data tokens (i.e., the number of visits values in the input sentence), which leads to high attentions on the mobility tokens and a better prediction performance. This result supports our motivation of introducing the Mob branch.

J2.6.2 Case Analysis 2. The ground truth label of this case is: There will be 24 people visiting POI 24. and the Transformer method yields a prediction of 18.41 for this example. As the POI id and the predicted number of visits are the same value (both 24), this case is more difficult. It requires the model to distinguish the same number with different meanings. From the first row of the second case (lower half of FIG. 17), it can be noticed that the G20 row (predicted mobility) has a relatively high attention on the POI id in the input tokens (G24 columns), while the G24 row (predicted POI id) has very low attention values on the input POI id tokens. It indicates that the S2S (Transformer) cannot well distinguish the mobility and the POI id in this case. This further results in worse prediction performance. However, with the help of the auxiliary Mob branch, SHIFT still can recognize and concentrate on the number of visits (the mobility data part) for this challenging case (the last row of FIG. 17). This demonstrates the superior prediction performance of the proposed SHIFT.

K Supplementary Material

K.1 Dataset Distribution

Figure 10:
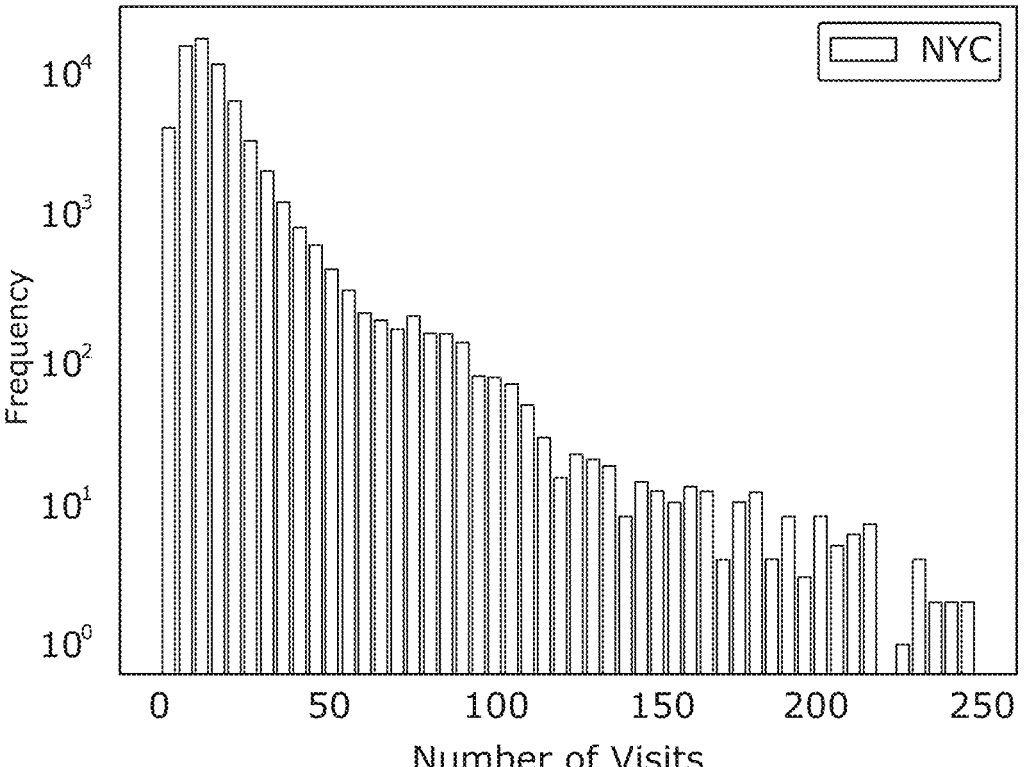
FIG. 10 shows the distribution of no. of visits over three data sets of the mobility data of FIG. 9.
Figure 10:
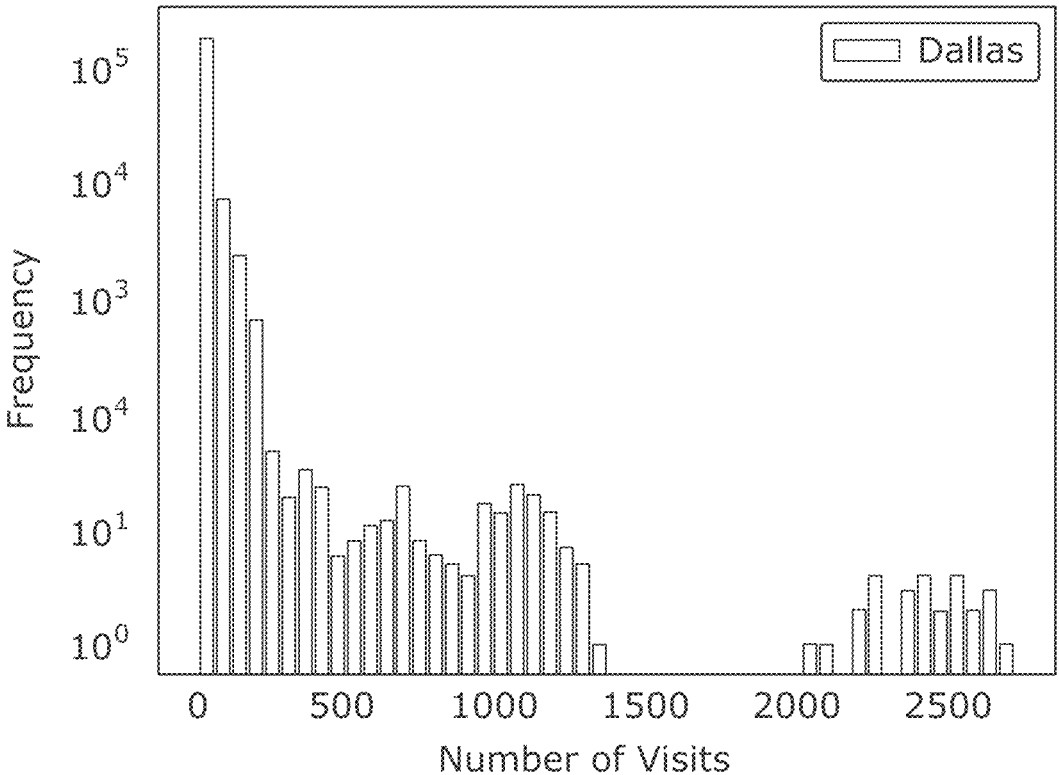
Figure 10:
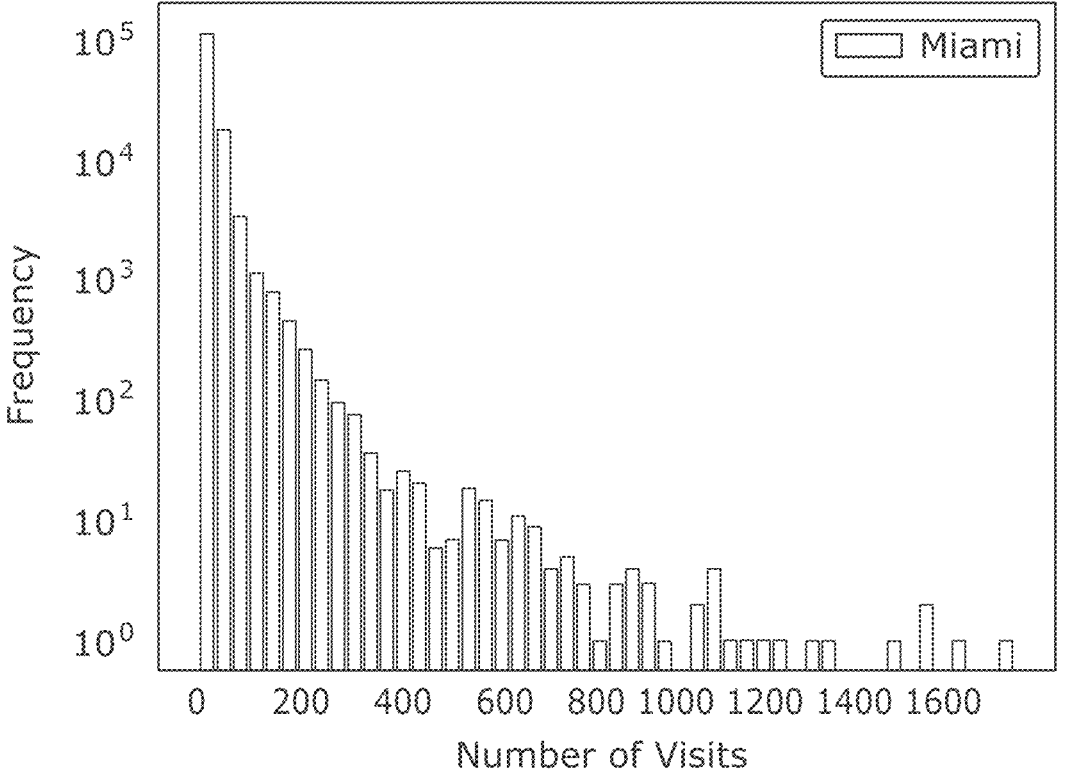

In addition to the statistics of three datasets listed in FIG. 9, the distribution plots of the number of visits are presented in FIG. 10. Based on these plots, we can see that the distribution of three cities are different. As shown in the main paper, the proposed SHIFT achieves good forecasting results on all three datasets, which further demonstrates the robustness of our SHIFT.

K.2 Computational Cost

In this section, we analysis the computational cost of SHIFT. FIG. 12 lists the GPU memory usage (in MB) during training and the number of trainable parameters of each method. These statistics are benchmarked while training each model on the NYC dataset.

Generally, the computational cost of language-based models (both S2S and SHIFT) are larger than numerical value-based forecasting models. Also, Transformer-based models require more resources than GRU-based models. These two observations are as expected.

Among all language-based methods, the cost of our SHIFT is very close and comparable to S2S (GruA) and S2S (Transformer), whereas the cost of S2S (BART) is significantly larger than others. From the table, we also notice that the number of trainable parameters of SHIFT is almost the same as S2S (Transformer) while SHIFT takes a little bit more GPU memory. Due to the extra Mob branch in SHIFT, it takes more memory during training. However, since the Mob branch encoder is updated in the momentum mode, this branch does not introduce many trainable parameters.

K.3 Pseudo-code of SHIFT

In Algorithm 1, the pseudo-code of SHIFT training process (using one epoch as example) is presented in the PyTorch-like style.

---

Algorithm 1 Pseudo-code of training SHIFT (PyTorch-like)

---

\# $\phi_n$, $f_N$, $f_D$: the embedding layer, encoder, and decoder of the NL branch
\# $\phi_m$, $f_M$, MLP: the embedding layer, encoder, and predictor of the Mob branch
\# $\alpha_{loss}$, $\alpha_m$: loss factor and momentum factor
1:    $\theta_M = \theta_N$     ⊳ Momentum updating initialization
2:    for (X, Y, $x_{t_{obs+1}}$, $\hat{Y}$) in train_data_loader do ⊳ Loading a batch of training data
3:       $h_N = f_N(\phi_n(Y))$     ⊳ NL branch encoding, Eqs. (1) & (2)
4:       $\hat{Y} = f_D(h_N)$     ⊳ NL branch decoding, Eq. (3)
5:       $h_M = f_M(\phi_m(X))$    ⊳ Mob branch encoding, Eqs. (4) & (5)
6:       $\bar{x}_{t_{obs+1}} = MLP(h_M)$     ⊳ Mob branch prediction, Eq. (6)
7:       $\mathcal{L}_N = CrossEntropy(\hat{Y}, Y)$    ⊳ NL branch loss, Eq. (8)
8:       $\mathcal{L}_M = MSE(\bar{x}_{t_{obs+1}}, x_{t_{obs+1}})$     ⊳ Mob branch loss, Eq. (9)
9:       $\mathcal{L} = (1 - \alpha_{loss})\mathcal{L}_N + \alpha_{loss}\mathcal{L}_M$    ⊳ Total loss, Eq. (10)
10:       $\mathcal{L}$.backward( )     ⊳ Back propagation
11:       update(SHIFT.params) ⊳ Update SHIFT parameters except for $\theta_M$
12:       $\theta_M \leftarrow \alpha_m\theta_N + (1 - \alpha_m)\theta_M$    ⊳ Momentum updating Mob branch, Eq. (7)
13:    end for

---

All of the features of the various example apparatus disclosed in this specification (including any accompanying claims, abstract and drawings), and/or all of the blocks of any method or process so disclosed, may be combined in any combination, except combinations where at least some of such features and/or blocks are mutually exclusive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A method comprising: obtaining historical data of a time series; converting, by a converter module, the historical data of the time series into natural language describing the historical data; sending the natural language describing the historical data to a natural language processing engine; and generating, by the natural language processing engine, output natural language which describes a forecast for the time series based on the natural language describing the historical data, wherein the converter module and the natural language processing engine are implemented by one or more processors, wherein the natural language engine is implemented by a neural network including a natural language branch and an auxiliary branch comprising a numerical time series predictor, and wherein the neural network has been trained on historical data of the time series using a combined loss function for the natural language branch and the auxiliary branch.

2. The method of claim 1, wherein the historical data includes time series data comprising a plurality of numerical data points and a plurality of time values corresponding to the numerical data points.

3. The method of claim 1, wherein the historical data includes an identifier which identifies a subject of the time series.

4. The method of claim 1, wherein the historical data includes semantic contextual data describing a property of one or more time values of the time series.

5. The method of claim 1, wherein the-historical data includes geographic data, such as but not limited to human mobility data or weather data.

6. The method of claim 1, wherein the time series includes a sequence of observations at different points in time of a number of people at one or more places of interest (POI) and optionally also includes text data categorising the POI and/or text data describing conditions relevant to one or more of the observations.

7. The method of claim 1, wherein the converter module converts the historical data into natural language having a pre-defined format.

8. The method of claim 1, wherein the converter modules uses a language template to convert the historical data into natural language describing the historical data.

9. The method of claim 8, wherein the natural language template comprises one or more predefined sentences or phrases including a plurality of gaps which are to be populated by historical data of the time series.

10. The method of claim 1, comprising:

a virtual assistant module receiving a natural language question;

the virtual assistant module determining a point of interest (POI) relevant to the natural language question;

the virtual assistant module obtaining historical data of a time series which historical data is relevant to the natural language question and the determined POI;

the virtual assistant module sending the obtained historical data to the converter module.

11. The method of claim 1 wherein the natural language processing branch and the auxiliary branch are linked by a momentum function.

12. The method of claim 11, wherein the momentum function has a momentum factor between 0.001 and 0.1.

13. The method of claim 11, wherein the combined loss function has a loss of 0.1 or less.

14. The method of claim 1, wherein the time series comprises a sequence of observations and the number of observations in the historic data set is in the range of 5 to 20 observations.

15. The method of claim 1, further comprising extracting numerical data from the output natural language and producing an output based on the numerical data.

16. The method of claim 11, further comprising controlling a physical process or initiate an electronic transaction based on the numerical data.

17. A method comprising: receiving natural language describing historical data of a time series; inputting the natural language describing the historical data to a natural language processing engine which has been trained on plurality of sentence pairs, each sentence pair comprising an input sentence describing the time series in a first time period and a corresponding target sentence forecasting the time series in a second time period; and generating, by the natural language processing engine, output natural language which describes a forecast for the time series based on the natural language describing the historical data, wherein the natural language processing engine is implemented by one or more processors, wherein the natural language engine is implemented by a neural network including a natural language branch and an auxiliary branch comprising a numerical time series predictor, and wherein the neural network has been trained on historical data of the time series using a combined loss function for the natural language branch and the auxiliary branch.

18. The method of claim 13, wherein the historical data further comprises contextual data relating to one or more time values or data points of the time series and wherein the natural language processing engine has been trained on sentence pairs which include contextual data as well as time values and data points.

* * * * *